US007151148B2

(12) United States Patent
Lutz et al.

(10) Patent No.: US 7,151,148 B2
(45) Date of Patent: Dec. 19, 2006

(54) CASTABLE GOLF BALL COMPONENTS USING ACRYLATE FUNCTIONAL RESINS

(75) Inventors: Mitchell E. Lutz, Fairhaven, MA (US); Manjari Kuntimaddi, Mattapoisett, MA (US)

(73) Assignee: Acushnet Company, Fairhaven, MA (US)

( * ) Notice: Subject to any disclaimer, the term of this patent is extended or adjusted under 35 U.S.C. 154(b) by 33 days.

(21) Appl. No.: 10/662,388

(22) Filed: Sep. 16, 2003

(65) Prior Publication Data

US 2005/0059793 A1 Mar. 17, 2005

(51) Int. Cl.
*A63B 37/12* (2006.01)

(52) U.S. Cl. .............. 526/301; 526/302; 525/454; 525/455; 528/75; 473/371; 473/374; 473/377; 473/378

(58) Field of Classification Search ........... 526/301, 526/302; 528/75; 525/454, 455; 473/371, 473/374, 377, 378
See application file for complete search history.

(56) References Cited

U.S. PATENT DOCUMENTS

| | | | |
|---|---|---|---|
| 3,236,895 A | 2/1966 | Lee et al. ............... 260/584 |
| 3,264,272 A | 8/1966 | Rees .................... 260/78.5 |
| 3,454,280 A | 7/1969 | Harrison et al. ........... 273/235 |
| 3,654,370 A | 4/1972 | Yeakey .................. 260/584 B |
| 3,819,768 A | 6/1974 | Molitor .................. 260/897 B |
| 4,068,849 A * | 1/1978 | DiSalvo et al. ........... 473/372 |
| 4,123,061 A | 10/1978 | Dusbiber ................ 273/220 |
| 4,323,247 A | 4/1982 | Keches et al. .......... 273/235 R |
| 4,390,662 A * | 6/1983 | Ando et al. .............. 525/28 |
| 4,526,375 A | 7/1985 | Nakade ................. 273/235 R |
| 4,560,168 A | 12/1985 | Aoyama .................. 273/232 |
| 4,884,814 A | 12/1989 | Sullivan ................ 273/235 R |
| 4,911,451 A | 3/1990 | Sullivan et al. ........ 273/235 R |
| 4,925,193 A | 5/1990 | Melvin et al. ............ 273/232 |
| 4,960,281 A | 10/1990 | Aoyama .................. 273/232 |
| 5,003,107 A | 3/1991 | Zimmerman et al. ...... 564/475 |
| 5,015,773 A | 5/1991 | Dobson .................. 564/474 |
| 5,248,878 A | 9/1993 | Ihara ................... 219/121.69 |
| 5,249,804 A | 10/1993 | Sanchez .................. 273/232 |
| 5,334,673 A | 8/1994 | Wu ...................... 273/235 R |
| 5,484,870 A | 1/1996 | Wu ....................... 528/28 |
| 5,562,552 A | 10/1996 | Thurman ................. 473/379 |
| 5,575,477 A | 11/1996 | Hwang ................... 473/379 |
| 5,688,191 A | 11/1997 | Cavallaro et al. ......... 473/373 |
| 5,713,801 A | 2/1998 | Aoyama ................. 473/354 |
| 5,803,831 A | 9/1998 | Sullivan et al. ........... 473/374 |
| 5,820,488 A | 10/1998 | Sullivan et al. ........... 473/374 |
| 5,849,168 A | 12/1998 | Lutz .................... 264/755 |
| 5,885,172 A | 3/1999 | Hebert et al. ............ 473/354 |
| 5,919,100 A | 7/1999 | Boehm et al. ............ 473/354 |
| 5,957,787 A | 9/1999 | Hwang .................. 473/379 |
| 5,965,669 A | 10/1999 | Cavallaro et al. .......... 525/221 |
| 5,981,654 A | 11/1999 | Rajagopalan ............. 525/66 |
| 5,981,658 A | 11/1999 | Rajagopalan et al. ....... 525/72 |
| 6,056,842 A | 5/2000 | Dalton et al. ............ 156/243 |
| 6,075,223 A | 6/2000 | Harrison ............... 219/121.85 |
| 6,099,415 A | 8/2000 | Lutz .................... 473/357 |
| 6,129,881 A | 10/2000 | Puniello ................ 264/278 |
| 6,149,535 A | 11/2000 | Bissonnette et al. ....... 473/354 |
| 6,152,836 A * | 11/2000 | Bradley et al. ........... 473/378 |
| 6,180,040 B1 | 1/2001 | Ladd et al. .............. 264/248 |
| 6,180,722 B1 | 1/2001 | Dalton et al. ............ 525/193 |
| 6,207,784 B1 | 3/2001 | Rajagopalan ............. 528/71 |
| 6,213,898 B1 | 4/2001 | Ogg .................... 473/383 |
| 6,235,230 B1 | 5/2001 | Puniello ................ 264/278 |
| 6,241,622 B1 | 6/2001 | Gobush et al. ........... 473/199 |
| 6,248,804 B1 | 6/2001 | Lutz .................... 523/160 |
| 6,284,835 B1 * | 9/2001 | Ellison ................. 524/590 |
| 6,286,364 B1 | 9/2001 | Aoyama et al. ........... 73/65.03 |
| 6,290,615 B1 | 9/2001 | Ogg .................... 473/378 |
| 6,303,704 B1 * | 10/2001 | Nesbitt ................. 525/333.8 |
| 6,315,915 B1 | 11/2001 | Hebert et al. ............ 216/67 |
| 6,338,684 B1 | 1/2002 | Winfield et al. ........... 473/378 |
| 6,358,161 B1 | 3/2002 | Aoyama ................. 473/383 |
| 6,379,138 B1 | 4/2002 | Puniello et al. ........... 425/116 |
| 6,383,092 B1 | 5/2002 | Ogg .................... 473/378 |
| 6,409,615 B1 | 6/2002 | McGuire et al. .......... 473/383 |
| 6,439,873 B1 * | 8/2002 | Marshall ................ 425/116 |
| 6,462,303 B1 | 10/2002 | Brown .................. 219/121.69 |
| 6,488,591 B1 | 12/2002 | Gobush et al. ........... 473/199 |
| 6,494,795 B1 | 12/2002 | Sullivan ................ 473/372 |
| 6,500,073 B1 | 12/2002 | Gobush et al. ........... 473/199 |
| 6,500,495 B1 | 12/2002 | Lutz .................... 427/500 |
| 6,705,959 B1 | 3/2004 | Morgan et al. ........... 473/383 |
| 2001/0005699 A1 | 6/2001 | Morgan et al. |
| 2001/0009310 A1 | 7/2001 | Hebert et al. |
| 2001/0018375 A1 | 8/2001 | Hayashi et al. |
| 2001/0019971 A1 | 9/2001 | Hayashi et al. |
| 2002/0025862 A1 | 2/2002 | Sullivan et al. |
| 2002/0028885 A1 | 3/2002 | Sullivan et al. |

(Continued)

FOREIGN PATENT DOCUMENTS

JP 07048477 * 2/1995

OTHER PUBLICATIONS

U.S. Appl. No. 10/409,144, filed Apr. 9, 2003 entitled "Polyurea and Polyurethane Compositions for Golf Equipment".

(Continued)

*Primary Examiner*—David J. Buttner
(74) *Attorney, Agent, or Firm*—Bingham McCutchen LLP

(57) ABSTRACT

Golf ball components, such as cores, intermediate layers, and covers, formed with compositions including precursors with acrylate functionality crosslinked with a curing agent.

24 Claims, 2 Drawing Sheets

U.S. PATENT DOCUMENTS

| | | |
|---|---|---|
| 2002/0079615 A1 | 6/2002 | Puniello et al. |
| 2002/0082358 A1 | 6/2002 | Ohira et al. |
| 2002/0151380 A1 | 10/2002 | Sullivan |
| 2002/0160859 A1 | 10/2002 | Morgan et al. |
| 2002/0160862 A1 | 10/2002 | Morgan et al. |
| 2003/0078348 A1 | 4/2003 | Rajagopalan et al. |
| 2003/0096936 A1 | 5/2003 | Wu et al. |
| 2003/0106442 A1 | 6/2003 | Gosetti |
| 2003/0114255 A1 | 6/2003 | Dalton et al. |
| 2003/0119989 A1 | 6/2003 | Ladd et al. |
| 2003/0125134 A1 | 7/2003 | Nardacci |

OTHER PUBLICATIONS

U.S. Appl. No. 10/339,603, filed Jan. 10, 2003 entitled "Polyurethane Compositions for Golf Balls".

U.S. Appl. No. 10/167,744, filed Jun. 13, 2002 entitled "Golf Ball with Multiple Cover Layers".

U.S. Appl. No. 09/717,136, filed Nov. 22, 2000 entitled "Method of Making Golf Balls".

* cited by examiner

CASTABLE GOLF BALL COMPONENTS USING ACRYLATE FUNCTIONAL RESINS

FIELD OF THE INVENTION

The invention relates to golf ball components including acrylate functional resins. In particular, the present invention is directed to various golf ball components, e.g., golf ball covers, cores, and intermediate layers, formed from a precursor with acrylate functionality crosslinked with a curing agent.

BACKGROUND OF THE INVENTION

Golf ball components are formed from a variety of compositions. For example, golf ball cores, intermediate layers, and covers may be formed from materials ranging from balata to ionomer resin to polyurethane or polyurea. Manufacturers constantly experiment with the different materials for use in the various golf ball layers in order to provide a golf ball that has desirable aerodynamic properties, "soft" feel, and increased durability.

For example, balata covered balls are favored by more highly skilled golfers because the softness of the cover allows the player to achieve spin rates sufficient to more precisely control ball direction and distance, particularly on shorter shots. However, balata covered balls are easily damaged, and thus lack the durability required by the average golfer.

Alternative cover compositions have been developed in an attempt to provide balls with spin rates and a feel approaching those of balata covered balls, while also providing a golf ball with a higher durability and overall distance. For instance, ionomer resins have, to a large extent, replaced balata as a cover material. Chemically, ionomer resins are a copolymer of an olefin and an α,β-ethylenically-unsaturated carboxylic acid having 10 to 90 percent of the carboxylic acid groups neutralized by a metal ion, as disclosed in U.S. Pat. No. 3,264,272. Commercially available ionomer resins include, for example, copolymers of ethylene and methacrylic or acrylic acid, neutralized with metal salts. Examples of commercially available ionomer resins include, but are not limited to, SURLYN® from DuPont de Nemours and Company, and ESCOR® and IOTEK® from Exxon Corporation. These ionomer resins are distinguished by the type of metal ion, the amount of acid, and the degree of neutralization.

U.S. Pat. Nos. 3,454,280, 3,819,768, 4,323,247, 4,526,375, 4,884,814, and 4,911,451 all relate to the use of SURLYN®-type compositions in golf ball covers. However, while SURLYN® covered golf balls, as described in the preceding patents, possess virtually cut-proof covers, the spin and feel are inferior compared to balata covered balls.

Polyurethanes have also been recognized as useful materials for golf ball covers since about 1960. For example, U.S. Pat. No. 4,123,061 teaches a golf ball made from a polyurethane prepolymer formed of polyether with diisocyanate that is cured with either a polyol or an amine-type curing agent. U.S. Pat. No. 5,334,673 discloses the use of two categories of polyurethane available on the market, i.e., thermoset and thermoplastic polyurethanes, for forming golf ball covers and, in particular, thermoset polyurethane covered golf balls made from a composition of polyurethane prepolymer and a slow-reacting amine curing agent, and/or a glycol.

Unlike ionomer resin covered golf balls, polyurethane golf ball covers can be formulated to possess the soft "feel" of balata covered golf balls. However, golf ball covers made from polyurethane have not, to date, fully matched ionomer resin golf balls with respect to resilience or the rebound of the golf ball cover, which is a function of the initial velocity of a golf ball after impact with a golf club.

Furthermore, because the polyurethanes used to make the covers of such golf balls generally contain an aromatic component, e.g., aromatic diisocyanate, polyol, or polyamine, they are susceptible to discoloration upon exposure to light, particularly ultraviolet (UV) light. To slow down the discoloration, light and UV stabilizers, e.g., TINUVIN® 770, 765, and 328, are added to these aromatic polymeric materials. However, to further ensure that the covers formed from aromatic polyurethanes do not appear discolored, the covers are painted with white paint and then covered with a clear coat to maintain the white color of the golf ball. The application of a uniform white pigmented coat to the dimpled surface of the golf ball is a difficult process that adds time and costs to the manufacture of a golf ball.

Polyureas have also been proposed as cover materials for golf balls. For instance, U.S. Pat. No. 5,484,870 discloses a polyurea composition comprising the reaction product of an organic isocyanate and an organic amine, each having at least two functional groups. Once these two ingredients are combined, the polyurea is formed, and thus the ability to vary the physical properties of the composition is limited. And, like polyurethanes, polyureas are not completely comparable to ionomer resin golf balls with respect to resilience or the rebound or damping behavior of the golf ball cover. Moreover, golf ball components cast from polyurethane or polyurea compositions involve complicated ratio and dynamic mixing requirements, which adds to possible waste during manufacturing if the requirements are not met.

Therefore, there remains a continuing need for golf ball components that may be cast using a composition that solves the problems associated with polyurethane and polyurea compositions discussed above, e.g., resilience reduction and complicated ratio and mixing requirements, while still obtaining the soft feel provided by such compositions. In particular, it would be advantageous to provide a composition formed from a preolymer with acrylate functionality crosslinked with a curing agent. For example, a polyurethane or polyurea backbone (the resilient segment) end-capped with an acrylate (the crosslinkable segment) would be beneficial for use in golf ball components to overcome the problems associated with prior art golf ball component compositions. In addition, it would be be beneficial to optimize the length of the precursor to control hardness and flexibility of the resultant elastomer. Moreover, there is a need in the art for golf ball compositions with improved light stability.

SUMMARY OF THE INVENTION

The present invention is directed to a golf ball including a core and a cover, wherein at least one of the core and the cover is cast from a castable reactive acrylate functional composition including at least one acrylate functional component and at least one free radical initiator. The at least one acrylate functional component may have a viscosity of about 100 cP or greater.

In one embodiment, the at least one acrylate functional component is selected from the group consisting of monofunctional, difunctional, trifunctional, tetrafunctional, and pentafunctional monomers and oligomers, and combinations thereof. In another embodiment, the at least one acrylate functional component comprises about 1 percent to about 100 percent urethane acrylate, urea acrylate, or a combination thereof. In still another embodiment, the at least one acrylate functional component is selected from the group consisting of water dispersible monomers, adhesion promoting monomers, pigment dispersing monomers, fire retarding monomers, metallic diacrylate, metallic dimethacrylate, epoxy acrylates, epoxy methacrylates, acrylate half esters, methacrylate half esters, polybutadiene acrylates, and combinations thereof.

The at least one free radical initiator may include at least one peroxide. For example, the at least one free radical initiator may be selected from the group consisting of di-t-amyl peroxide, tert-amyl peroxy-2-ethylhexyl carbonate, t-amyl peroxyacetate, ethyl 3,3-D (t-amylperoxy) butyrate, 2,2-di-(t-amylperoxy)propane, t-amyl perbenzoate, di(2-t-butyl-peroxyisopropyl)benzene peroxide, 1,1-bis(t-butylperoxy)-3,3,5-trimethylcyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and mixtures thereof. In another embodiment, the at least one free radical initiator comprises at least one azo compound.

A golf ball formed according to the invention may further include an intermediate layer. In one embodiment, the intermediate layer includes an ionomeric material. In another embodiment, the golf ball further includes at least one top coat disposed about the cover.

The cover may have a thickness of about 50 μm or greater. In one embodiment, the cover has a thickness of about 0.2 inches to about 0.035 inches.

The present invention is also directed to an acrylate functional composition for a structural layer of a golf ball including a polyurethane backbone formed from the reaction of at least one isocyanate and at least one polyol; at least one unsaturated acrylate functional segment reacted with the polyurethane backbone; and at least one free radical initiator. In one embodiment, the composition forms a cover layer of a golf ball.

In one embodiment, the at least one unsaturated acrylate functional segment includes hydroxy-terminated acrylates, amine-terminated acrylates, or mixtures thereof. In another embodiment, the at least one acrylate functional segment includes hydroxy-terminated acrylate, methacrylate, methyl methacrylate, ethyl acrylate, ethyl methacrylate, butyl acrylate, butyl methacrylate, glycidyl acrylate, glycidal methacrylate, or mixtures thereof.

In this aspect of the invention, the at least one free radical initiator may include at least one peroxide, e.g., di-t-amyl peroxide, di(2-t-butyl-peroxyisopropyl)benzene peroxide, 1,1-bis(t-butylperoxy)-3,3,5-trimethylcyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, or mixtures thereof. In one embodiment, the at least one free radical initiator is selected from the group consisting of di-t-amyl peroxide, tert-amyl peroxy-2-ethylhexyl carbonate, t-amyl peroxyacetate, ethyl 3,3-D (t-amylperoxy) butyrate, 2,2-di-(t-amylperoxy)propane, t-amyl perbenzoate, and mixtures thereof.

In one embodiment, the composition includes about 1 to about 100 percent of urethane acrylate and about 99 percent to 0 percent of at least one unsaturated acrylate resin. For example, the at least one unsaturated acrylate resin may include epoxy acrylates, epoxy methacrylates, acrylate half esters, methacrylate half esters, polybutadiene acrylates, urea acrylates, and combinations thereof.

The present invention also relates to an acrylate functional composition for a structural layer of a golf ball including: a polyurea backbone formed from the reaction of at least one isocyanate, at least one amine-terminated compound; at least one unsaturated acrylate functional segment reacted with the polyurea backbone; and at least one free radical initiator.

In one embodiment, the at least one unsaturated acrylate functional segment includes acrylate, methacrylate, methyl methacrylate, ethyl acrylate, ethyl methacrylate, butyl acrylate, butyl methacrylate, glycidyl acrylate, glycidal methacrylate, or mixtures thereof.

The amine-terminated compound may be selected from the group consisting of amine-terminated hydrocarbons, amine-terminated polyethers, amine-terminated polyesters, amine-terminated polycaprolactones, amine-terminated polycarbonates, amine-terminated polyamides, and mixtures thereof. In one embodiment, the amine-terminated compound comprises primary amines, secondary amines, triamines, or combinations thereof.

In one embodiment, the polyurea backbone includes linkages having the general formulae:

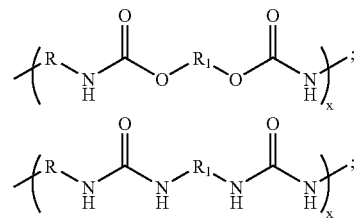

or a mixture thereof, wherein x is the chain length, i.e., about 1 or greater, and wherein R and R1 are straight chain or branched hydrocarbon chains having about 1 to about 20 carbons, and wherein the linkages form greater than about 10 percent of the polyurea backbone.

In another embodiment, the polyurea backbone consists essentially of linkages having the general formula:

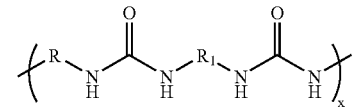

wherein x is the chain length, i.e., about 1 or greater, and wherein R and R1 comprise straight chain or branched hydrocarbon chains having about 1 to about 20 carbons, and wherein the linkages form greater than about 10 percent of the polyurea backbone.

In this aspect of the invention, the at least one free radical initiator may include at least one peroxide. In one embodiment, the at least one free radical initiator is selected from the group consisting of di-t-amyl peroxide, tert-amyl peroxy-2-ethylhexyl carbonate, t-amyl peroxyacetate, ethyl 3,3-D (t-amylperoxy)butyrate, 2,2-di-(t-amylperoxy)propane, t-amyl perbenzoate, and mixtures thereof.

In another embodiment, the composition includes about 1 to about 100 percent of urea acrylate and about 99 percent to 0 percent of at least one unsaturated acrylate resin.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
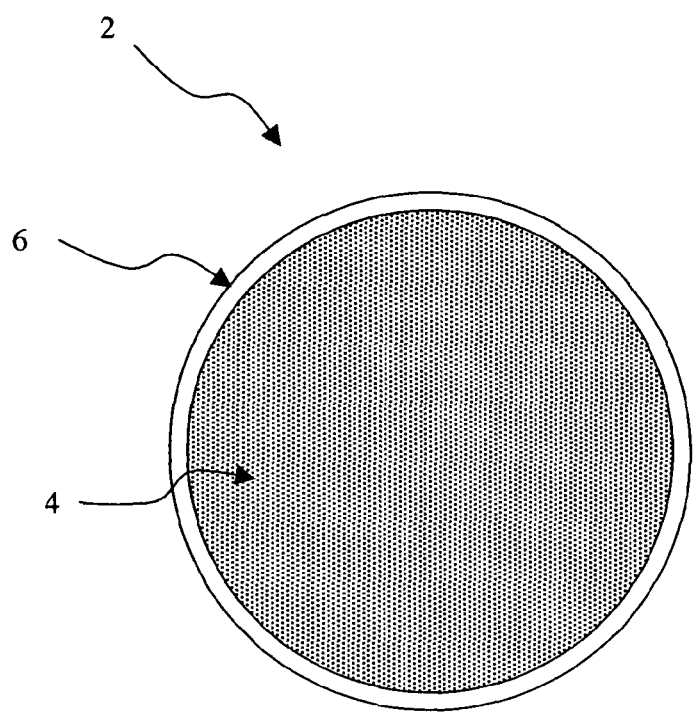
FIG. 1 is a cross-sectional view of a two layer ball, wherein at least a portion of the golf ball is formed from the compositions of the invention.

The present invention contemplates castable compositions for golf equipment. In particular, the castable compositions of the invention are formed by mixing together an acrylate functional monomer or oligomer and a thermally decomposing initiator or, depending on the thickness of the sample, the acrylate functional monomer or oligomer may be polymerized with electron beam, ultraviolet radiation, or other suitable radiation sources. The use of acrylate and methacrylate-terminated monomers and oligomers allow golf ball manufacturers to customize golf balls to have specific hardness values, flexibility properties, abrasion resistance, chemical resistance, crosslink density, and light stability properties.

For example, the compositions of the invention may have a polyurethane and/or a polyurea segment endcapped with at least one acrylic end segment. The polyurethane and polyurea segments provide the resilient portion of the polymer, while the acrylic end segment provides crosslinkability. In one embodiment, both ends of the polyurethane or polyurea segment are capped with acrylates. The acrylate end-capped products are then mixed with a free radical initiator to produce a castable syrup.

The compositions of the invention may be used in a variety of golf ball constructions, e.g., one-piece, two-piece, or multilayer balls, as well as golf club components, e.g., club head inserts. When included in various golf ball components, e.g., golf ball covers, the compositions of the invention produce golf balls with physical and aerodynamic properties better than or equal to golf balls incorporating conventional castable blends, such as polyurethane or polyurea. In addition, because the problems associated with conventional castable blends are eliminated, i.e., complicated ratio and dynamic mixing requirements, manufacturing time and costs may be decreased. Furthermore, because acrylates are known to be light stable, compositions including precursors with acrylate end-caps, wherein the precursors are based on aliphatic components, have improved light stability over traditional aromatic castable compositions.

Compositions of the Invention

As briefly mentioned above, the compositions of the invention include at least one monomer or oligomer with acrylate functionality and at least one thermally decomposing initiator to form a castable reactive syrup. In one embodiment, the acrylate functionality is in the form of at least one acrylate end cap. In another embodiment, the acrylate functionality is achieved by encapping both ends of the monomer or oligomer with acrylates. For example, the compositions of the invention may include a resilient polymer precursor as the backbone, endcapped with unsaturated acrylic resins to provide acrylate functionality, wherein the acrylate functionality provides crosslinkability to the castable reactive composition. Thus, the compositions of the invention preferably include a monomer or oligomer with at least one acrylate functionality.

Monomers suitable for use in the precursor function primarily as a reactive diluent, which lowers the viscosity for processing and crosslinking agents. In one embodiment, the monomers used with the present invention have a viscosity of about 20 centipoise (cP) or greater. In another embodiment, the viscosity is about 100 cP or greater. In still another embodiment, the viscosity is about 1,000 cP or greater. In yet another embodiment, the viscosity of the monomer is about 25,000 cP or less. For example, the viscosity of the monomer may be about 100 cP to about 5000 cP.

Nonlimiting examples of monomers suitable for use with the present invention include monofunctional monomers, difunctional monomers, trifunctional monomers, tetrafunctional monomers, pentafunctional monomers, water dispersible monomers, adhesion promoting monomers, pigment dispersing monomers, fire retarding monomers, metallic coagents, and combinations thereof.

For example, monofunctional monomers may include, but are not limited to, allyl methacrylate, caprolactone acrylate, 2 (2-ethoxyethoxy)ethylacrylate, ethoxylated nonyl phenol acrylate, glycidyl methacrylate, isobornyl acrylate, isobornyl methacrylate, isodecyl acrylate, isodecyl methacrylate, isooctyl acrylate, lauryl acrylate, lauryl methacrylate, 2-phenoxyethyl acrylate, 2-phenoxyethyl methacrylate, polypropylene glycol monomethacrylate, stearyl acrylate, stearyl methacrylate, tetrahydrofurfuryl acrylate, tetrahydrofurfuryl methacrylate, tridecyl acrylate, tridecyl methacrylate, and combinations thereof.

Difunctional monomers may include, but are not limited to, alkoxylated aliphatic diacrylate, 1,4-butanediol diacrylate, 1,4-butanediol dimethacrylate, 1,3-butylene glycol diacrylate, 1,3-butylene glycol dimethacrylate, diethylene glycol diacrylate, diethylene glycol dimethacrylate, ethoxylated$_4$ bisphenol A diacrylate, ethoxylated$_{10}$ bisphenol A diacrylate, ethoxylated$_{30}$ bisphenol A dimethacrylate, ethoxylated$_2$ bisphenol A diacrylate, ethoxylated$_2$ bisphenol A dimethacrylate, ethoxylated$_6$ bisphenol A dimethacrylate, ethoxylated$_{12}$ bisphenol A dimethacrylate, ethoxylated$_4$ bisphenol A dimethacrylate, ethylene glycol dimethacrylate, 1,6-hexanediol diacrylate, 1,6-hexanediol dimethacrylate, neopentyl glycol diacrylate, neopentyl glycol dimethacrylate, polyethylene glycol (200) diacrylate, polyethylene glycol (400) diacrylate, polyethylene glycol (600) diacrylate, polyethylene glycol dimethacrylate, polyethylene glycol (400) dimethacrylate, polyethylene glycol (600) dimethacrylate, propoxylated neopentyl glycol diacrylate, tetraethylene glycol diacrylate, tetraethylene glycol dimethacrylate, triethylene glycol diacrylate, triethylene glycol dimethacrylate, tripropylene glycol diacrylate, and combinations thereof.

Trifunctional monomers may include, but are not limited to, highly propoxylated glyceryl triacrylate, ethoxylated$_3$ trimethylolpropane triacrylate, ethoxylated$_6$ trimethylolpropane triacrylate, ethoxylated$_9$ trimethylolpropane triacrylate, ethoxylated$_{15}$ trimethylolpropane triacrylate, ethoxylated$_{20}$ trimethylolpropane triacrylate, pentaerythritol triacrylate, propoxylated glyceryl triacrylate, propoxylated$_3$ trimethylolpropane triacrylate, propoxylated$_6$ trimethylolpropane triacrylate, trimethylolpropane triacrylate, trimethylolpropane trimethacrylate, tris(2-hydroxy ethyl)isocyanurate triacrylate, and mixtures thereof.

Tetrafunctional and pentafunctional monomers include, but are not limited to, dipentaerythritol pentaacrylate, di-trimethylolpropane tetraacrylate, ethoxylated pentaerythritol tetraacrylate, pentaacrylate ester, pentaerythritol tetraacrylate, and combinations thereof. Water dispersible monomers include, but are not limited to, 2 (2-ethoxyethoxy)ethylacrylate, ethoxylated$_{15}$ trimethylolpropane triacrylate, ethoxylated$_{20}$ trimethylolpropane triacrylate, ethoxylated$_{30}$ trimethylolpropane triacrylate, metallic diacrylate, metallic dimethacrylate, polyethylene glycol (200) diacrylate, polyethylene glycol (400) diacrylate, polyethylene glycol (600) diacrylate, polyethylene glycol (400) dimethacrylate, polyethylene glycol (600) dimethacrylate, polypropylene glycol monomethacrylate, and mixtures thereof. Adhesion promoting monomers include, but are not limited to, alkoxylated trifunctional acrylate ester, metallic diacrylate, modified metallic diacrylate, monofunctional acid ester, trifunctional acid ester, trifunctional acrylate ester, trifunctional methacrylate ester, and combinations thereof.

Nonlimiting examples of pigment dispersing monomers, fire retarding monomers, and metallic coagents include alkoxylated diacrylate, ethoxylated tetrabromo bisphenol A diacrylate, metallic diacrylate, metallic dimethacrylate, metallic monomethacrylate, modified metallic diacrylate, and modifed metallic dimethacrylate.

Any oligomer is suitable for use with the present invention provided the oligomer has acrylate functionality on the backbone. The molecular weight of the oligomer is preferably as high as possible. For example, the molecular weight may be from about 25,000 to about 500,000. In one embodiment, the molecular weight of the oligomer is about 100,000 to about 450,000. In another embodiment, the molecular weight of the oligomer is about 150,000 to about 400,000.

Oligomers according suitable for use with the present invention include, but are not limited to urethane acrylates (discussed in greater detail below), urea acrylates, epoxy acrylates, epoxy methacrylates, aromatic acid acrylate half esters, aromatic acid methacrylate half esters, and combinations thereof. In addition, a suitable oligomer according to the present invention may be a polybutadiene end-capped with acrylates.

The viscosity of the oligomer is preferably about 1000 cP to about 500,000 cP. In one embodiment, the viscosity of the oligomer is about 150,000 cP to about 450,000 cP. In another embodiment, the viscosity of the oligomer is about 175,000 cP to about 425,000 cP.

In an alternate embodiment, the oligomer may be a low viscosity oligomer, such as low viscosity aromatic monoacrylate, low viscosity aliphatic diacrylate, low viscosity aliphatic triacrylate, and polyester acrylate. The viscosity of these oligomers may be about 5000 cP or less, preferably about 1000 cP or less. In one embodiment, the viscosity is about 40 cP or greater. In another embodiment, the viscosity is about 100 cP or greater. In yet another embodiment, the viscosity of the oligomer is about 150 cP or greater. In still another embodiment, the viscosity of the oligomer is about 1000 cP or greater.

According to one aspect of the present invention, the compositions of the invention include a polyurethane and/or polyurea precursor with acrylic end caps. The polyurethane precursor may be formed with at least one isocyanate and at least one polyol, whereas the polyurea precursor is formed from at least one isocyanate and at least one polyamine. The precursor are then endcapped with acrylates and mixed with a thermally decomposing initiator.

Acrylates

Any acrylate capable of endcapping a resilient polymer precursor is contemplated for use with the present invention. As used herein, the term "acrylates" is intended to refer to the following generic structure:

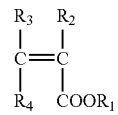

where $R_1$, $R_2$, $R_3$, and $R_4$ are independently hydrogen, aliphatic, aromatic carbocyclic, heterocyclic, halogenated perfluoroalkyl, dialkylaminoalkyl, or substituted moieties, each having less than about 20 carbon atoms. In one embodiment, R1 is an alkyl or cycloalkyl moiety such as methyl, ethyl, propyl, isopropyl, n-butyl, sec-butyl, t-butyl, methylhexyl, ethylhexyl, n-amyl, isoamyl, n-octyl, stearyl, lauryl, or cyclohexyl moiety.

For example, the acrylate may be at least one of a hydroxy-terminated acrylate, an amine-terminated acrylate, or a mixture thereof. Non-limiting examples of useful acrylates according to the invention include $C_1$–$C_8$ alkyl esters or glycidyl ester derivatives of unsaturated carboxylic acids such as acrylate, methacrylate, methyl methacrylate, ethyl acrylate, ethyl methacrylate, butyl acrylate, butyl methacrylate, glycidyl acrylate, glycidal methacrylate, and mixtures thereof.

In one embodiment, the acrylate is selected from the group consisting of hydroxyethyl methacrylates, hydroxypropyl methacrylates, hydroxybutyl methacrylates, trimethylolpropane monomethacrylates and dimethacrylates, pentaerythritol monomethacrylates, dimethacrylates, trimethacrylates, dipentaerythritol monomethacrylates, dimethacrylates, trimethacrylates, tetramethacrylates, and pentamethacrylates, neopentyl glycol methacrylates, hexanediol monomethacrylates, tris(2-hydroxyethyl)isocyanurate monomethacrylates and dimethacrylates, polypropylene glycol monomethacrylates, polyethylene glycol monomethacrylates, polypropylene/polyethylene glycol monomethacrylates, polybutyl glycol monomethacrylates, polytetramethylene glycol monomethacrylates, hydroxy polycaprolacton monomethacrylates, ethoxylated and propoxylated derivatives thereof, and mixtures thereof.

Polyurethane Precursors

The compositions of the invention may include a polyurethane precursor as the backbone, where the precursor is a product formed by a reaction between at least one diisocyanate and at least one polyol. The components of the polyurethane precursor may be aromatic, aromatic-aliphatic, or aliphatic, which provide varying degrees of light stability. As used herein, aromatic aliphatic compounds should be understood as those containing an aromatic ring, wherein the isocyanate group is not directly bonded to the ring. One example of an aromatic aliphatic compound is a tetramethylene diisocyanate (TMXDI).

Along a continuum, an aromatic composition is less light stable than an aromatic-aliphatic composition, which is less light stable than an aliphatic composition. For example, an aliphatic composition made according to the invention includes only saturated components, i.e., components substantially free of unsaturated carbon-carbon bonds or aromatic groups, which prevents yellowing over time. The term "saturated," as used herein, refers to compositions having saturated aliphatic and alicyclic polymer backbones, i.e., with no carbon-carbon double bonds. It is important to note, however, that aromatic compositions made according to the invention may include light stabilizers to improve light stability. Thus, light stability may be accomplished in a variety of ways for the purposes of this application.

Isocyanates for use with the polyurethane precursor include aliphatic, cycloaliphatic, aromatic aliphatic, aromatic, derivatives thereof, and combinations of these compounds having two or more isocyanate (NCO) groups per molecule. As briefly mentioned above, however, the isocyanate is preferably saturated to improve the light stability of the composition of the invention. The isocyanates may be organic polyisocyanate-terminated precursors, low free isocyanate precursors, and mixtures thereof. The isocyanate-containing reactable component may also include any isocyanate-functional monomer, dimer, trimer, or multimeric adduct thereof, precursor, quasi-precursor, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic or linear or branched hydrocarbon moiety containing from about 1 to 20 carbon atoms. The diisocyanate may also contain one or more cyclic groups. When multiple cyclic groups are present, linear and/or branched hydrocarbons containing from about 1 to 10 carbon atoms can be present as spacers between the cyclic groups. In some cases, the cyclic group(s) may be substituted at the 2-, 3-, and/or 4-positions, respectively. Substituted groups may include, but are not limited to, halogens, primary, secondary, or tertiary hydrocarbon groups, or a mixture thereof.

Examples of saturated (aliphatic) diisocyanates that can be used in the polyurethane precursor include, but are not limited to, ethylene diisocyanate; propylene-1,2-diisocyanate; tetramethylene diisocyanate; tetramethylene-1,4-diisocyanate; 1,6-hexamethylene diisocyanate (HDI); HDI biuret prepared from HDI; octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In one embodiment, the saturated diisocyanates include isophoronediisocyanate (IPDI), 4,4'-dicyclohexylmethane diisocyanate ($H_{12}$MDI), 1,6-hexamethylene diisocyanate (HDI), or a combination thereof.

As briefly discussed, aromatic aliphatic isocyanates may also be used to form the polyurethane precursor. While use of aromatic aliphatic materials does not confer the same amount of light stability to the resultant product compared to those including purely aliphatic materials, it does provide a greater degree of light stability to the resultant product compared to those formed with purely aromatic materials. Examples of aromatic aliphatic isocyanates include 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uretdione of any polyisocyanate, such as uretdione of toluene diisocyanate, uretdione of hexamethylene diisocyanate, and mixtures thereof; a modified polyisocyanate derived from the above isocyanates and polyisocyanates; and mixtures thereof. In addition, the aromatic aliphatic isocyanates may be mixed with any of the saturated isocyanates listed above for the purposes of this invention.

Unsaturated diisocyanates, i.e., aromatic compounds, may also be used with the present invention, although the use of unsaturated compounds in the precursor is preferably coupled with the use of a light stabilizer or pigment as discussed below. Examples of unsaturated diisocyanates include, but are not limited to, substituted and isomeric mixtures including 2,2'-, 2,4'-, and 4,4'-diphenylmethane diisocyanate (MDI), 3,3'-dimethyl-4,4'-biphenyl diisocyanate (TODI), toluene diisocyanate (TDI), polymeric MDI (PMDI, a brown liquid composed of approximately 50% methylene diisocyanate with the remainder comprised of oligomers of MDI), carbodimide-modified liquid 4,4'-diphenylmethane diisocyanate, para-phenylene diisocyanate (PPDI), meta-phenylene diisocyanate (MPDI), triphenylmethane-4,4'-, and triphenylmethane-4,4"-triisocyanate, napthylene-1,5,-diisocyanate, 2,4'-, 4,4'-, and 2,2'-biphenyl diisocyanate, polyphenylene polymethylene polyisocyanate (PMDI) (also known as polymeric PMDI), and mixtures thereof.

An isocyanate group reacts with the hydroxyl groups of a polyol to form the repeating urethane linkage, which have the following general structure:

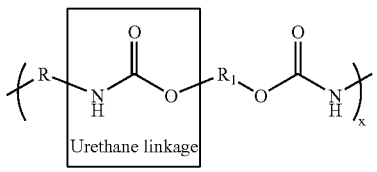

where x is the chain length, i.e., about 1 or greater, and R and $R_1$ are straight chain or branched hydrocarbon chain having about 1 to about 20 carbons. In one embodiment, the backbone includes about 10 percent or greater urethane linkages.

The polyol suitable for the present invention may be organic, modified organic, saturated, aliphatic, alicyclic, unsaturated, araliphatic, aromatic, substituted, or unsubstituted. The polyol preferably has two or more reactive hydrogen groups per molecule, such as primary or secondary hydroxyl groups or amine groups, and at least one cyclic, aromatic, aliphatic, linear, branched, or substituted hydrocarbon moiety containing from 1 to about 20 carbon atoms, such as arylenes, aralkylenes, alkylenes, or cycloalkylenes. When multiple cyclic or aromatic groups are present, linear, branched or substituted hydrocarbons containing from 1 to about 10 carbon atoms can be present as spacers between such cyclic or aromatic groups. In some cases, the cyclic or aromatic group(s) may be substituted at the 2-(ortho-), 3-(meta-), and/or 4-(para-) positions. Substituted groups may include, but are not limited to, halogens, cyano groups, amine groups, silyl groups, hydroxyl groups, acid groups, alkoxy groups, primary or secondary or tertiary hydrocarbon groups, or a combination of two or more groups thereof. Any and all of the polyols disclosed herein may be used alone or in combination of two or more thereof.

The polyol may be hydroxy-and/or amine-terminated oligomers or polymers preferably used in forming a precursor with the isocyanate, or hydroxy- and/or amine-containing compounds reactive to the precursor or the isocyanate, preferably used as curing agents for chain-extension and/or crosslink. The hydroxyl and/or amine groups may be terminal or pendant groups on the oligomeric or polymeric backbone, and in the case of secondary amine groups, may even be embedded within the backbone.

Suitable hydroxy-terminated oligomers or polymers has a molecular weight of at least about 200 and at least two primary or secondary hydroxyl terminal groups per molecule, and include, but are not limited to hydroxy-terminated polyethers, hydroxy-terminated polyesters, hydroxy-terminated polycaprolactones, hydroxy-terminated polycarbonates, hydroxy-terminated polyhydrocarbons, hydroxy-terminated acid functional oligomers or polymers (or ionomers thereof derived from partial or full neutralization with organic or inorganic cations), and the like.

Suitable hydroxy-terminated polyethers include, but are not limited to polytetramethylene ether glycol ("PTMEG"); low-molecular-weight PTMEG; modified PTMEG; hydroxy-terminated copolymer of polytetrahydrofuran and polymethyltetrahydrofuran ("PTG-L"); poly(oxyethylene)glycol; poly(oxypropylene)glycol; (ethylene oxide)-capped poly(oxypropylene)ether glycol; poly(oxyethylene-co-oxypropylene) glycol; and mixtures thereof.

Suitable hydroxy-terminated polyesters include, but are not limited to, poly(ethylene adipate)glycol; poly(butylene adipate)glycol; poly(hexamethylene adipate)glycol; poly(ethylene propylene adipate)glycol; poly(ethylene butylene adipate)glycol; poly(hexamethylene butylene adipate)glycol; (o-phthalate-1,6-hexanediol)-based polyester polyol; poly(ethylene terephthalate)-based polyester polyol, and mixtures thereof.

Suitable hydroxy-terminated polycaprolactones include, but are not limited to, (alkylene oxide)-initiated polycaprolactones; (ethylene glycol)-initiated polycaprolactone; (diethylene glycol)-initiated polycaprolactone; (propylene glycol)-initiated polycaprolactone; (dipropylene glycol)-initiated polycaprolactone; 1,4-butanediol-initiated polycaprolactone; trimethylolpropane-initiated polycaprolactone; (neopentyl glycol)-initiated polycaprolactone; 1,6-hexanediol-initiated polycaprolactone; PTMEG-initiated polycaprolactone; 2-ethyl-2-(hydroxymethyl)-1,3-propanediol initiated polycaprolactone; and mixtures thereof.

Examples of suitable hydroxy-terminated polycarbonates include, but are not limited to poly(phthalate carbonate) glycol; poly(hexamethylene carbonate)glycol; poly(1,4-cyclohexanedimethylene carbonate)glycol; (bisphenol A)-based polycarbonate glycols; and mixtures thereof.

Non limiting examples of hydroxy-terminated polyhydrocarbons include polyisoprene polyol (a.k.a. liquid isoprene rubber); poly(hydrogenated isoprene) polyol; polybutadiene polyol; poly(hydrogenated butadiene) polyol; and mixtures thereof.

Hydroxy-terminated acid functional oligomers or polymers that may used with the present invention include, but are not limited to, dimerate or trimerate polyols of fatty acids or isostearic acid; acid functional polyols as disclosed in U.S. Pat. No. 6,207,784; and Other hydroxy-terminated polymers may be used with the present invention, such as hydroxy-terminated polyolefins; hydroxy-terminated polyamides; glycerol-based polyols; (castor oil)-based polyols; hydroxy-terminated alkylene-styrene copolymers (a.k.a. Kraton® polyols); and hydroxy-terminated acrylic polyols.

Saturated members of the above-listed hydroxy-terminated oligomers or polymers are preferred for use in the present invention, because they afford superior light stability when incorporated into the golf ball compositions of the invention. Saturated hydroxy-terminated polymers may be aliphatic, alicyclic, or fully hydrogenated. Exemplary saturated hydroxy-terminated polymers include, but are not limited to, PTMEG; low-molecular-weight PTMEG; modified PTMEG; PTG-L; poly(oxyethylene)glycol; poly(oxypropylene)glycol; (ethylene oxide)-capped poly(oxypropylene)ether glycol; poly(ethylene adipate)glycol; poly(butylene adipate)glycol; poly(hexamethylene adipate) glycol; poly(ethylene propylene adipate) glycol; poly(ethylene butylene adipate)glycol; poly(hexamethylene butylene adipate)glycol; (alkylene oxide)-initiated polycaprolactones; (ethylene glycol)-initiated polycaprolactone; (diethylene glycol)-initiated polycaprolactone; (propylene glycol)-initiated polycaprolactone; (dipropylene glycol)-initiated polycaprolactone; 1,4-butanediol-initiated polycaprolactone; trimethylolpropane-initiated polycaprolactone; (neopentyl glycol)-initiated polycaprolactone; 1,6-hexanediol-initiated polycaprolactone; PTMEG-initiated polycaprolactone; poly(hexamethylene carbonate)glycol; saturated poly(hydrogenated isoprene) polyol; saturated poly (hydrogenated butadiene) polyol; saturated dimerate or trimerate polyols of fatty acids or isostearic acid; saturated hydroxy-terminated polyolefins; saturated hydroxy-terminated polyamides; saturated glycerol-based polyols; saturated (castor oil)-based polyols; and saturated hydroxy-terminated alkylene-styrene copolymers.

Suitable amine-terminated oligomers or polymers preferably have molecular weights of at least about 200 and at least two primary or secondary amine terminal groups per molecule. Because lower molecular weight amine-terminated polymers may be prone to forming solids, a high molecular weight between about 1,000 and about 5,000 is more preferred.

Exemplary amine-terminated oligomers or polymers include, but not limited to,amine-terminated polyethers and other amine-terminated polymers. Suitable amine-terminated polyethers include, but are not limited to polyoxyalkylene diamines; polyoxyethylene diamines, polyoxypropylene diamines; polyoxypropylene triamine; poly(tetramethylene ether) diamines; (ethylene oxide)-capped polyoxypropylene ether diamines, poly(triethyleneglycol) diamines; poly(trimethylolpropane)triamines; polyethyleneglycol-di(p-aminobenzoate); polytetramethyleneoxide-di(p-aminobenzoate); glycerin-based triamines; and mixtures thereof. Other amine-terminated polymers include, but are not limited toamine-terminated polyesters, amine-terminated polycaprolactones, amine-terminated polycarbonates, amine-terminated polyhydrocarbons, amine-terminated acid functional polymers, amine-terminated polyolefins, amine-terminated polyamides, and amine-terminated polyacrylics, preferably prepared from the above-listed hydroxy-terminated polymers using a method including, for example, reductive amination of polyether polyols with ammonia and hydrogen in the presence of a catalyst (Belgian Patent No. 634,741, U.S. Pat. Nos. 5,015,773, 5,003,107, and 3,654,370); hydrogenation of cyanoethylated polyols (German Patent No. 1,193,671); amination of polyol/sulfonic acid esters (U.S. Pat. No. 3,236,895); reacting polyols with epichlorohydrin and a primary amine (French Patent No. 1,466,708); or those listed in the publication "Jeffamine, Polyoxypropylene Amines" by Texaco Chemical Co., 1978.

Saturated members of the above-listed amine-terminated polymers are preferred for use in the present invention, because they afford superior light stability when incorporated into the golf ball compositions of the invention. Saturated amine-terminated polymers may be aliphatic, alicyclic, or fully hydrogenated. Exemplary saturated amine-terminated polymers include, but are not limited to, polyoxyalkylene diamines; polyoxyethylene diamines; polyoxypropylene diamines; polyoxypropylene triamine; poly(tetramethylene ether) diamines; (ethylene oxide)-capped polyoxypropylene ether diamines; poly(triethyleneglycol) diamines; poly(trimethylolpropane)triamines; saturated glycerin-based triamines; saturated amine-terminated polyesters; saturated amine-terminated polycaprolactones; saturated amine-terminated polycarbonates; saturated amine-terminated polyhydrocarbons; saturated amine-terminated acid functional polymers; saturated amine-terminated polyolefins; saturated amine-terminated polyamides; and saturated amine-terminated polyacrylics.

In one embodiment, the polyol is based on a hydrophobic backbone. By using polyols based on a hydrophobic backbone, the polyurethane compositions of the invention may be more water resistant than those polyurethane compositions having polyols without a hydrophobic backbone. Some non-limiting examples of polyols based on a hydrophobic backbone include hydrocarbon polyols, hydroxy-terminated polybutadiene polyols, polyethers, polycaprolactones, and polyesters.

As known to those of ordinary skill in the art, the polyurethane precursor contains some amount of free isocyanate monomer. Thus, in one embodiment, the polyurethane precursor may be stripped of free isocyanate monomer. For example, after stripping, the precursor may contain about 1 percent or less free isocyanate monomer. In another embodiment, the precursor contains about 0.5 percent by weight or less of free isocyanate monomer.

Polyurea Precursors

The compositions of the invention may also be based on a polyurea precursor, where the precursor is a product formed by a reaction between at least one diisocyanate and at least one amine-terminated compound. The polyurea precursors are preferably saturated and, therefore, in one embodiment, the precursor is the product of a reaction between at least one saturated diisocyanate and at least one saturated amine-terminated compound.

For the purposes of the present invention, the polyurea precursors include primarily urea linkages having the following general structure:

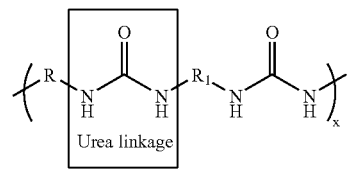

where x is the chain length, i.e., about 1 or greater, and R and $R_1$ are straight chain or branched hydrocarbon chain having about 1 to about 20 carbons. In one embodiment, the precursor includes about 10 percent or greater urea linkages.

It should be understood that polymer precursors for use with the present invention that are based on urea linkages preferably provide a comparable or greater degree of softness to the resulting elastomer as that of a polymer segment based on urethane linkages. In fact, the main difference between the polyurethane precursors discussed above and the polyurea precursors discussed in this section is the substitution of the polyol component with an amine-terminated compound. Therefore, the isocyanates suitable for inclusion in the polyurea precursors are the same as those listed above with respect to the polyurethane segment, which are incorporated by reference here. And, as above, while saturated isocyanates are preferred, aromatic aliphatic isocyanates and aromatic isocyanates are contemplated for use with the present invention.

It should also be understood, however, that a polymer precursor including primarily urea linkages may have distinctly different properties than a polymer including primarily urethane linkages due to the substitution of the polyol with the amine-terminated compound. For example, a polyurea precursor used according to the present invention, i.e., encapped with acrylate functionality, may provide different shear, cut, resiliency, and adhesion properties to the resultant elastomer as compared to an elastomer formed with a polyurethane precursor with acrylate functionality.

Any amine-terminated compound available to one of ordinary skill in the art is suitable for use in the polyurea precursor. For example, the amine-terminated compound may include amine-terminated hydrocarbons, amine-terminated polyethers, amine-terminated polyesters, amine-terminated polycarbonates, amine-terminated polycaprolactones, and mixtures thereof. The amine-terminated segments may be in the form of a primary amine ($NH_2$), a secondary amine (NHR), or mixtures thereof. Co-pending U.S. patent application Ser. No. 10/409,144, filed Apr. 9, 2003, entitled "Polyurea and Polyurethane Compositions for Golf Equipment," which is incorporated by reference herein, discloses suitable amine-terminated compounds for use with the present invention.

The molecular weight of the amine-terminated compound for use in the invention may range from about 100 to about 10,000. As used herein, the term "about" is used in connection with one or more numbers or numerical ranges, and should be understood to refer to all such numbers, including all numbers in a range. In one embodiment, the amine-terminated compound is about 500 or greater, preferably about 1000 or greater, and even more preferably about 2000 or greater. In another embodiment, the amine-terminated compound molecular weight is about 8000 or less, preferably about 4,000 or less, and more preferably about 3,000 or less. For example, in one embodiment, the molecular weight of the amine-terminated compound is about 1000 to about 4000. Because lower molecular weight polyether amines may be prone to forming solid polyureas, a higher molecular weight oligomer may be used to avoid solid formation.

In one embodiment, the amine-terminated compound includes amine-terminated hydrocarbons having the following generic structures:

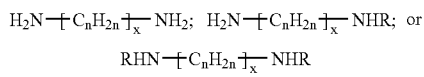

where x is the chain length, i.e., 1 or greater, n is preferably about 1 to about 12, and R is any alkyl group having from about 1 to about 20 carbon atoms, preferably about 1 to about 12 carbon atoms, a phenyl group, a cyclic group, or mixture thereof.

The amine-terminated compound may also includes amine-terminated polyethers having following generic structures:

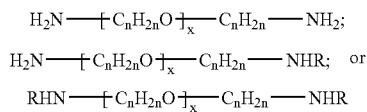

where x is the chain length, i.e., 1 or greater, n is preferably about 1 to about 12, and R is any alkyl group having from about 1 to about 20 carbon atoms, preferably about 1 to about 12 carbon atoms, a phenyl group, a cyclic group, or mixture thereof. One example of an amine-terminated polyether is a polyether amine. As used herein, "polyether amine" refers to a polyoxyalkyleneamine containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea precursors. In one embodiment, the polyether backbone is based on tetramethylene, propylene, ethylene, trimethylolpropane, glycerin, and mixtures thereof.

In one embodiment, the polyether amine has the generic structure:

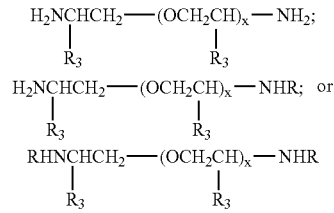

wherein the repeating unit x has a value ranging from about 1 to about 70, R is any alkyl group having from about 1 to about 20 carbon atoms, preferably about 1 to about 12 carbon atoms, a phenyl group, a cyclic group, or mixture thereof, and $R_3$ is a hydrogen, methyl group, or a mixture thereof. Even more preferably, the repeating unit may be from about 5 to about 50, and even more preferably is from about 12 to about 35.

In another embodiment, the polyether amine has the generic structure:

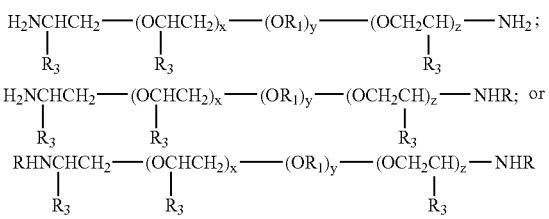

wherein the repeating units x and z have combined values from about 3.6 to about 8 and the repeating unit y has a value ranging from about 9 to about 50, R is an alkyl group having about 1 to about 20 carbons, a phenyl group, a cyclic group, or mixtures thereof, $R_1$ is —$(CH_2)_a$—, wherein "a" may be a repeating unit ranging from about 1 to about 10, a phenylene group, a cyclic group, or mixtures thereof, and $R_3$ is a hydrogen, methyl group, or a mixture thereof.

In yet another embodiment, the polyether amine has the generic structure:

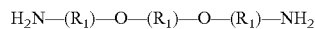

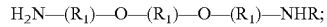

or

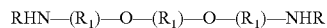

wherein R is an alkyl group having about 1 to about 20 carbons, phenyl groups, cyclic groups, or mixtures thereof, and wherein $R_1$ is —$(CH_2)_a$—, wherein "a" may be a repeating unit ranging from about 1 to about 10, a phenylene group, a cyclic group, or mixtures thereof.

Suitable polyether amines include, but are not limited to, methyldiethanolamine; polyoxyalkylenediamines such as, polytetramethylene ether diamines, polyoxypropylenetriamine, polyoxyethylene diamines, and polyoxypropylene diamines; poly(ethylene oxide capped oxypropylene)ether diamines; propylene oxide-based triamines; triethyleneglycoldiamines; trimethylolpropane-based triamines; glycerin-based triamines; and mixtures thereof. In one embodiment, the polyether amine used to form the precursor is Jeffamine® D2000 (manufactured by Huntsman Corporation of Austin, Tex.).

The molecular weight of the polyether amine for use in the invention may range from about 100 to about 5000. In one embodiment, the polyether amine molecular weight is about 200 or greater, preferably about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 4000, preferably about 1000 to about 4000, and more preferably is between about 1500 to about 2500. Because lower molecular weight polyether amines may be prone to forming solid polyureas during precursor preparation, a higher molecular weight oligomer, such as Jeffamine® D2000, is preferred.

In addition, the amine-terminated compound may include amine-terminated polyesters having the generic structures:

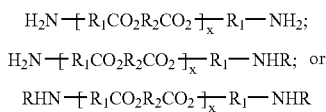

where x is the chain length, i.e., 1 or greater, preferably about 1 to about 20, R is any alkyl group having from about 1 to about 20 carbon atoms, preferably about 1 to about 12 carbon atoms, a phenyl group, a cyclic group, or mixture thereof, and $R_1$ and $R_2$ are straight or branched hydrocarbon chains, e.g., alkyl or aryl chains.

Copolymers of polycaprolactone and polyamines may also be used to form the polyurea segments of the present invention. These copolymers include, but are not limited to, bis(2-aminoethyl)ether initiated polycaprolactone, 2-(2-aminoethylamino)ethanol, 2-2(aminoethylamino)ethanol, polyoxyethylene diamine initiated polycaprolactone, propylene diamine initiated polycaprolactone, polyoxypropylene diamine initiated polycaprolactone, 1,4-butanediamine initiated polycaprolactone, trimethylolpropane-based triamine initiated polycaprolactone, neopentyl diamine initiated polycaprolactone, hexanediamine initiated polycaprolactone, polytetramethylene ether diamine initiated polycaprolactone, and mixtures thereof. In addition, polycaprolactone polyamines having the following structures may be useful in forming the polyurea segments of the present invention:

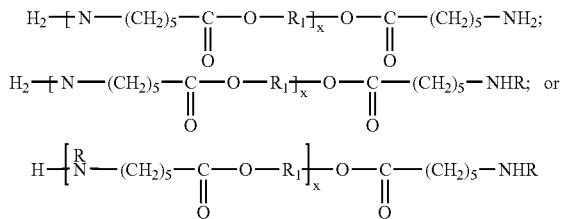

where x is the chain length, i.e., 1 or greater, preferably about 1 to about 20, R is one of an alkyl group having from about 1 to about 20 carbons, preferably about 1 to about 12 carbons, a phenyl group, or a cyclic group, and $R_1$ is a straight or branched hydrocarbon chain including about 1 to about 20 carbons.

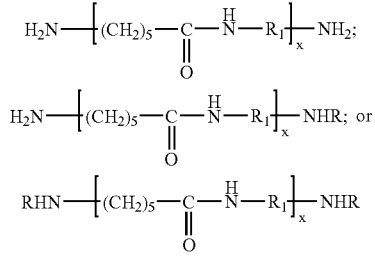

where x is the chain length, i.e., 1 or greater, preferably about 1 to about 20, R is one of an alkyl group having from about 1 to about 20 carbons, preferably about 1 to about 12 carbons, a phenyl group, or a cyclic group, and $R_1$ is a straight or branched hydrocarbon chain including about 1 to about 20 carbons.

In another embodiment, the amine-terminated compound may be an amine-terminated polycarbonate having one of the following generic structures:

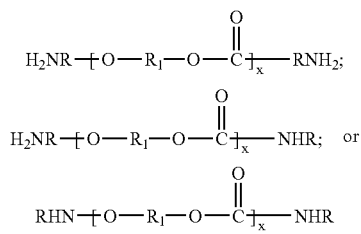

where x is the chain length, which preferably ranges from about 1 to about 20, R is one of an alkyl group having from about 1 to about 20 carbons, preferably about 1 to about 12 carbons, a phenyl group, or a cyclic group, and $R_1$ is a straight chain hydrocarbon or predominantly bisphenol A units or derivatives thereof.

Amine-terminated polyamides may also be reacted with the isocyanate component to form the polyurea segment of the present invention. Suitable amine-terminated polyamides include, but are not limited to, those having following structures:

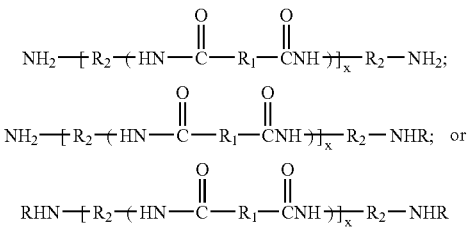

where x is the chain length, i.e., about 1 or greater, R is one of an alkyl group having from about 1 to about 20 carbons, preferably about 1 to about 12 carbons, a phenyl group, or a cyclic group, $R_1$ is an alkyl group having about 1 to about 12 carbon atoms, a phenyl group, or a cyclic group, and $R_2$ is an alkyl group having about 1 to about 12 carbon atoms (straight or branched), a phenyl group, or a cyclic group.

Additional amine-terminated compounds that may also be useful in forming the polyurea segments of the present invention include, but are not limited to, poly(acrylonitrile-co-butadiene); poly(1,4-butanediol)bis(4-aminobenzoate) in liquid or waxy solid form; linear and branched polyethylenimine; low and high molecular weight polyethylenimine having an average molecular weight of about 500 to about 30,000; poly(propylene glycol)bis(2-aminopropyl ether) having an average molecular wieght of about 200 to about 5,000; polytetrahydrofuran bis (3-aminopropyl) terminated having an average molecular weight of about 200 to about 2000; and mixtures thereof, all of which are available from Aldrich of Milwaukee, Wis.

Thus, in one embodiment, the polyurea segment includes a poly(acrylonitrile-co-butadiene) having one of the following structures:

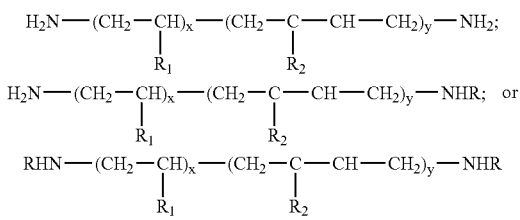

wherein x and y are chain lengths, i.e., greater than about 1, R is any alkyl group having from about 1 to about 20 carbon atoms, preferably about 1 to about 12 carbon atoms, a phenyl group, a cyclic group, or mixture thereof, $R_1$ is a hydrogen, methyl group, cyano group, phenyl group, or a mixture thereof, and $R_2$ is a hydrogen, a methyl group, chloride, or a mixture thereof. In one embodiment, the y:x ratio is about 82:18 to about 90:10. In other words, the poly(acrylonitrile-co-butadiene) may have from about 10 percent to about 18 percent acrylonitrile by weight.

In another embodiment, the polyurea segment includes a poly(1,4-butanediol)bis(4-aminobenzoate) having one of the following structures:

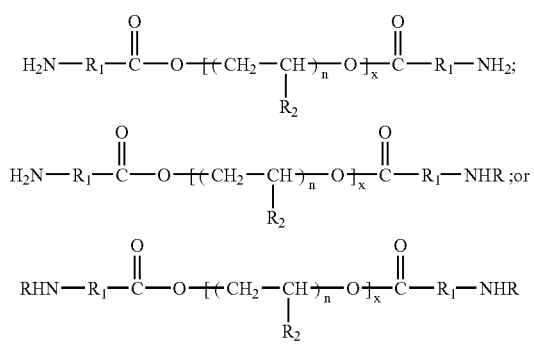

where x and n are chain lengths, i.e., 1 or greater, and n is preferably about 1 to about 12, R and $R_1$ are linear or branched hydrocarbon chains, an alkyl group having from about 1 to about 20 carbons, preferably about 1 to about 12 carbons, a phenyl group, a cyclic group, or mixtures thereof, and $R_2$ is a hydrogen, a methyl group, or a mixture thereof. In one embodiment, $R_1$ is phenyl, $R_2$ is hydrogen, and n is about 2.

In yet another embodiment, the polyurea segment includes at least one linear or branched polyethyleneimine having one of the following structures:

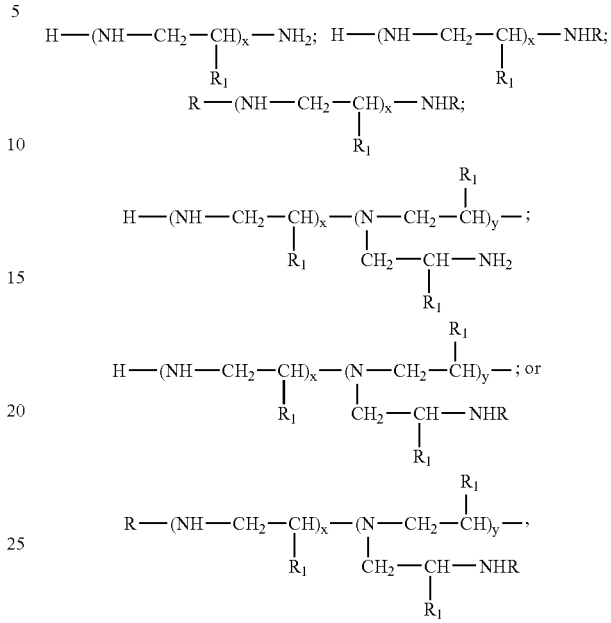

wherein x and y are chain lengths, i.e., greater than about 1, R is any alkyl group having from about 1 to about 20 carbon atoms, preferably about 1 to about 12 carbon atoms, a phenyl group, a cyclic group, or mixture thereof, and $R_1$ is a hydrogen, methyl group, or a mixture thereof. In one embodiment, $R_1$ is hydrogen. In another embodiment, the polyurea composition includes a mixture of linear and branched polyethyleneimines.

In still another embodiment, the polyurea segment of the present invention includes a polytetrahydrofuran bis(3-aminopropyl) terminated compound having one of the following structures:

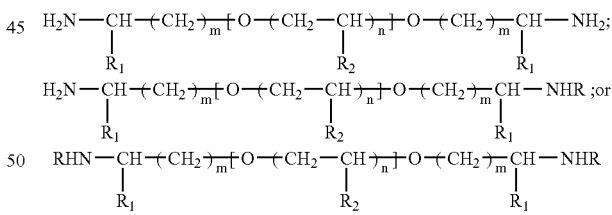

where m and n are chain lengths, i.e., 1 or greater, n is preferably about 1 to about 12 and m is preferably about 1 to about 6, R is any one alkyl group having from about 1 to about 20 carbons, preferably about 1 to about 12 carbons, a phenyl group, a cyclic group, or mixtures thereof, and $R_1$ and $R_2$ are hydrogen, methyl groups, or mixtures thereof. In one embodiment, both $R_1$ and $R_2$ are hydrogen and both m and n are about 2.

By using amine-terminated compounds based on a hydrophobic segment, the polyurea precursors may provide more water resistance than those polyurea segments formed with an amine-terminated hydrophilic segment. Thus, in one embodiment, the amine-terminated compound includes hydrophobic backbone, e.g., an unsaturated or saturated hydrocarbon-based amine-terminated compound. One example of an amine-terminated hydrocarbon is an amine-terminated polybutadiene.

The amine-terminated compound may also be blended with additional polyols, as discussed above with respect to the polyurethane precursors. Once a polyol is included in the polyurea precursor, however, the excess isocyanate in the mixture reacts with the hydroxyl groups in the polyol and forms urethane linkages, which results in a precursor that includes both urea and urethane linkages. Such a precursor is distinct from a polyurea precursor including only an isocyanate and an amine-terminated compound or a polyurethane precursor including only an isocyanate and a polyol. For the sake of clarity, this type of segment will be referred to as a polyurea-polyurethane precursor throughout the application. Regardless of the type of precursor, e.g., polyurethane precursor, polyurea precursor, or polyurea-polyurethane precursor, unsaturated acrylic components are used to endcap at least one end of the precursor according to the invention.

Free Radical Source

A free-radical source, often alternatively referred to as a free-radical initiator, is preferably used to polymerize the acrylate end-capped polymers. Depending on the thickness of the sample, however, the polymers may also be polymerized using electron beam, ultraviolet radiation, gamma radiation, x-rays, or any other high energy radiation source capable of generating free radicals. It should be further understood that heat often facilitates initiation of the generation of free radicals.

The free radical initiator used according to the invention is any known polymerization initiator (a co-crosslinking agent) which decomposes during the cure cycle. Examples of suitable initiators include, but are not limited to, peroxides, persulfates, azo compounds, benzophenones, hydrazides, and combinations thereof.

The free-radical source is preferably a peroxide, more preferably an organic peroxide, which decomposes during the polymerization cycle. Suitable free-radical sources include organic peroxide compounds, such as di-t-amyl peroxide, di(2-t-butyl-peroxyisopropyl)benzene peroxide or α,α-bis (t-butylperoxy) diisopropylbenzene, 1,1-bis(t-butylperoxy)-3,3,5-trimethylcyclohexane or 1,1-di(t-butylperoxy) 3,3,5-trimethyl cyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and the like, and any mixture thereof. In a preferred embodiment, the peroxide is a poor hydrogen abstracting peroxide such as di-t-amyl peroxide, tert-amyl peroxy-2-ethylhexyl carbonate, t-amyl peroxyacetate, ethyl 3,3-D (t-amylperoxy)butyrate, 2,2-di-(t-amylperoxy)propane, and t-amyl perbenzoate.

Commercially available examples include, but are not limited to, the LUPEROX® DTA (Atofina Chemicals of Philadelphia, Pa.), VAROX® 231 XL and VAROX® DCP—R (Atofina Chemicals of Philadelphia, Pa.); PERKODOX® BC and PERKODOX® 14 (Akzo Nobel of Chicago, Ill.); and ELASTOCHEM® DCP-70 (Rhein Chemie of Trenton, N.J.).

It is well known that peroxides are available in a variety of forms having different activity. The activity is typically defined by the "active oxygen content." For example, PERKODOX® BC peroxide is 98 percent active and has an active oxygen content of 5.8 percent, whereas PERKODOXS DCP-70 is 70 percent active and has an active oxygen content of 4.18 percent. The peroxide is typically present in an amount greater than about 0.1 parts per hundred of the total resilient polymer component, preferably about 0.1 to 15 parts per hundred of the resilient polymer component, and more preferably about 0.2 to 5 parts per hundred of the total resilient polymer component. If the peroxide is present in pure form, it is preferably present in an amount of at least about 0.25 pph, more preferably between about 0.35 pph and about 2.5 pph, and most preferably between about 0.5 pph and about 2 pph. Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 pph of a pure peroxide is equivalent 4 pph of a concentrate peroxide that is 50 percent active (i.e., 2 divided by 0.5=4).

In one embodiment, the amount of free radical source is about 5 pph or less, preferably about 3 pph or less, more preferably about 2.5 pph or less, and even more preferably about 2 pph or less. In still another embodiment, the amount of free radical source is about 1 pph or less, preferably about 0.75 pph or less.

A catalyst may also be employed to lower the initiation temperature if a higher temperature free radical initiator is used. A suitable catalyst may include cobalt, which is commercially available from OMG Industries under the tradename COBALT TEN-CEM®, COBALT HEX-CEM®, and COBALT CEM-ALL.

As known to those of ordinary skill in the art, the catalyst concentration is highly dependent on the choice of the peroxide and cure cycle. Thus, a skilled artisan would be able to select the appropriate catalyst concentration once the peroxide and cure cycle are known. In one embodiment, the catalyst is included in the compositions of the invention in an amount of about 0.005 percent to about 1 percent. In another embodiment, the catalyst is present in an amount of about 0.05 weight percent or greater. In another embodiment, the catalyst is present in an amount of about 0.5 weight percent or greater.

Methods of Forming

The compositions of the invention may be formed using a variety of methods. For example, in one embodiment, when forming a urethane or urea precursor end-capped with acrylate(s), the composition may be formed using a one-step method, wherein the isocyanate, polyol or polyamine, respectively, and acrylate are mixed and reacted all at once. In another embodiment, a molar excess of isocyanate is reacted with a polyol or polyamine to form a polyurethane precursor or polyurea precursor, respectively. The precursor is then mixed and reacted with the acrylate in a subsequent step. Regardless of whether a one-step or two-process is used, the reaction product, which has acrylate functionalities, is then reacted or crosslinked with a free radical mechanism. Those of ordinary skill in the art would recognize that, in addition to the examples discussed above and below, other suitable methods exist for forming the acrylate functional monomers and oligomers of the present invention.

Reaction schemes 1–3, shown below, provide examples of the chemistry involved when forming urethane acrylates according to the invention:

Reaction Scheme 1:

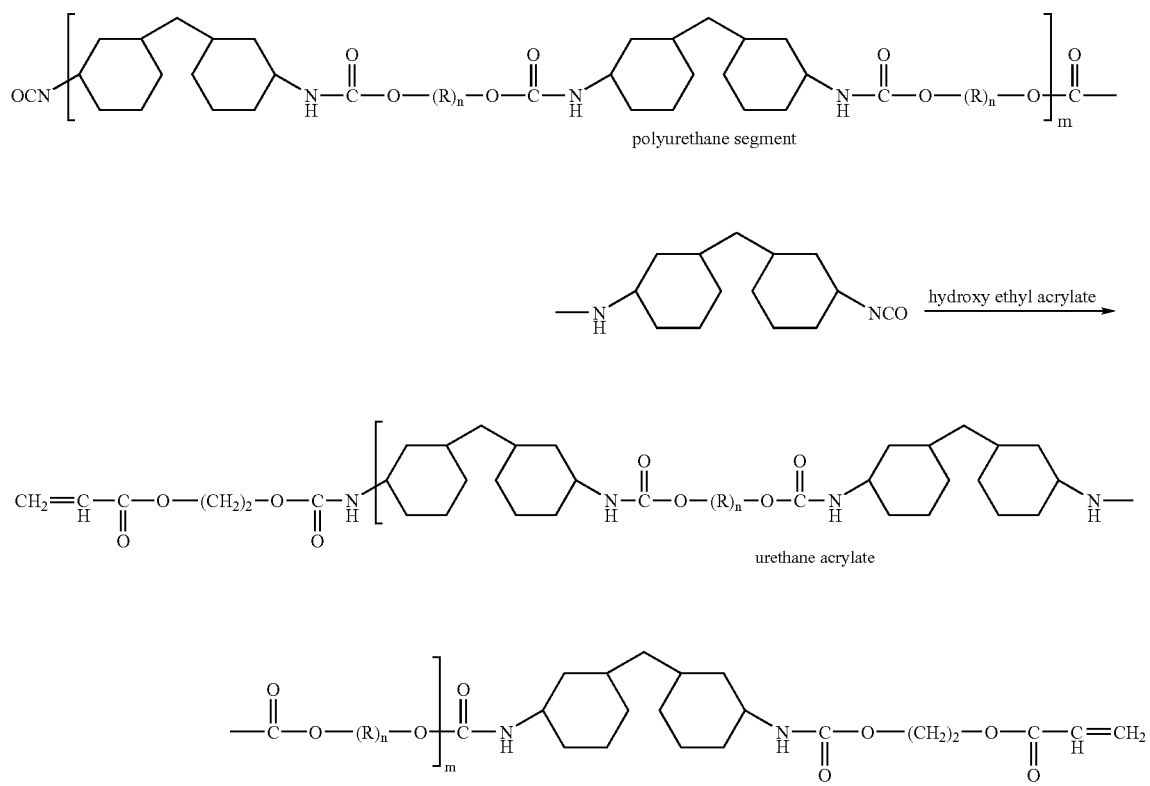

where R may be polyether-based, polyester-based, polycaprolactone-based, polycarbonate-based, hydrocarbon based, acrylic based, and polyamide based, depending on the specific type of polyol employed, and where n and m are chain lengths, i.e., about 1 or greater. In one embodiment, n is from about 1 to about 100. While this reaction scheme uses $H_{12}MDI$ as the isocyanate to form the polyurethane segment, any isocyanate may be substituted. In one embodiment, the molecular weight of the polyol employed is about 200 to about 6000. In addition, the viscosity of the polyol employed is preferably about 100 cPs to about 10,000 cPs at temperatures of 25° C. to 110° C.

Reaction Scheme 2:

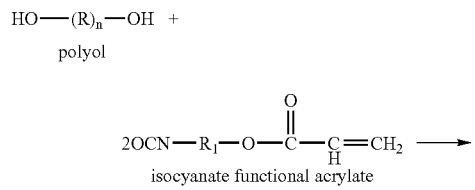

-continued

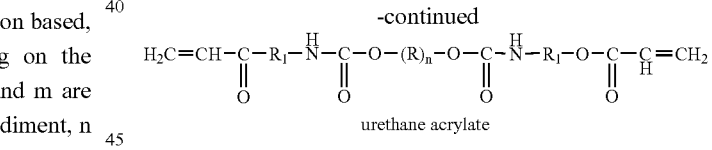

where R may be polyether-based, polyester-based, polycaprolactone-based, polycarbonate-based, hydrocarbon based, acrylic based, and polyamide based, depending on the specific type of polyol employed. In one embodiment, the molecular weight of the polyol employed is about 200 to about 6000. In addition, the viscosity of the polyol employed is preferably about 100 cPs to about 10,000 cPs at temperatures of 25° C. to 110° C. $R_1$ may be cyclic, aromatic, aliphatic, linear, branched, or substituted hydrocarbon moiety including from 1 to about 20 carbon atoms, e.g., arylenes, aralkylenes, alkylenes, or cycloalkylenes. When multiple cyclic or aromatic groups are present, linear, branched or substituted hydrocarbons containing from 1 to about 10 carbon atoms can be present as spacers between such cyclic or aromatic groups. In some cases, the cyclic or aromatic group(s) may be substituted at the 2-(ortho-), 3-(meta-), and/or 4-(para-) positions. Substituted groups may include, but are not limited to, halogens, cyano groups, amine groups, silyl groups, hydroxyl groups, acid groups, alkoxy groups, primary or secondary or tertiary hydrocarbon groups, or a combination of two or more groups thereof.

Reaction Scheme 3:

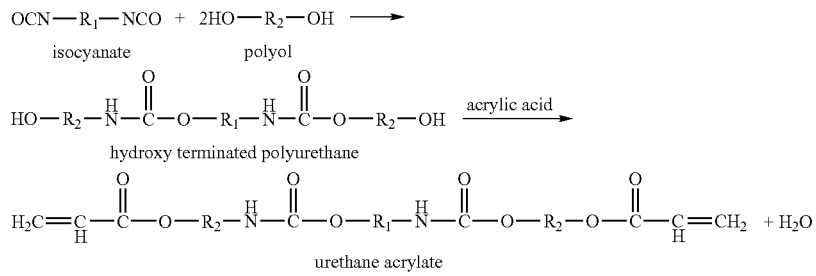

where $R_1$ may be cyclic, aromatic, aliphatic, linear, branched, or substituted hydrocarbon moiety including from 1 to about 20 carbon atoms, e.g., arylenes, aralkylenes, alkylenes, or cycloalkylenes. When multiple cyclic or aromatic groups are present, linear, branched or substituted hydrocarbons containing from 1 to about 10 carbon atoms can be present as spacers between such cyclic or aromatic groups. In some cases, the cyclic or aromatic group(s) may be substituted at the 2-(ortho-), 3-(meta-), and/or 4-(para-) positions. Substituted groups may include, but are not limited to, halogens, cyano groups, amine groups, silyl groups, hydroxyl groups, acid groups, alkoxy groups, primary or secondary or tertiary hydrocarbon groups, or a combination of two or more groups thereof. $R_2$ may be polyether-based, polyester-based, polycaprolactone-based, polycarbonate-based, hydrocarbon based, acrylic based, and polyamide based, depending on the specific type of polyol employed. In one embodiment, the molecular weight of the polyol employed is about 200 to about 6000. In addition, the viscosity of the polyol employed is preferably about 100 cPs to about 10,000 cPs at temperatures of 25° C. to 110° C.

The general chemistry behind urea acrylates differs from the urethane acrylates in that the urethane linkages are substituted with urea linkages. For example, the polyol in reaction scheme is substituted with an amine-terminated compound discussed above to provide the polyurea segment, which is then reacted with acrylic acid to provide urea acrylate.

The final product will contain acrylate functionalities and may be polymerized or crosslinked with a free radical source.

Other Additives

Additional materials may be added to the compositions of the invention including, but not limited to, coloring agents or dyes, optical brighteners, crosslinking agents, whitening agents such as $TiO_2$ and ZnO, UV absorbers, hindered amine light stabilizers, defoaming agents, processing aids, softening agents, plasticizers, surfactants, impact modifiers, fillers, reinforcing materials, compatibilizers, coupling agents, zinc diacrylate, and other conventional additives. The additional materials may be thermoplastic or thermoset in nature. Those of ordinary skill in the art are aware of the purpose of these additives and the amounts that should be employed to fulfill those purposes.

For example, fillers may be added to the compositions of the invention to affect rheological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas (such as colloidal silica), regrind (recycled core material typically ground to about 30 mesh particle), high-Mooney-viscosity rubber regrind, and mixtures thereof.

In addition, the compositions of the invention may contain at least one light stabilizing component. As used herein, light stabilizer may be understood to include hindered amine light stabilizers, ultraviolet (UV) absorbers, and antioxidants. While the compositions of the invention preferably include only saturated components, which are typically resistant to discoloration, they are not immune to deterioration in their mechanical properties upon weathering. Addition of UV absorbers and light stabilizers to any of the above compositions may help to maintain the tensile strength, elongation, and color stability. The use of light stabilizing components also may assist in preventing cover surface fractures due to photodegradation. Suitable light stabilizers include, but are not limited to, TINUVIN® 292, TINUV® 328, TINUVIN® 213, TINUVIN® 765, TINUVIN 770 and TINUVIN® 622. TINUVIN® products are available from Ciba Specialty Chemicals of Tarrytown, N.Y. In one embodiment, the light stabilizer is UV absorber TINUVIN® 328, which is useful with aromatic compounds. In another embodiment, hindered amine light stabilizer TINUVIN 765 is used with aromatic or aliphatic compounds. In addition, TINUVIN® 292 may also be used with the aromatic or aliphatic compositions of the invention.

As discussed above, dyes, as well as optical brighteners and fluorescent pigments may also be included in the golf ball covers produced with polymers formed according to the present invention. Such additional ingredients may be added in any amounts that will achieve their desired purpose.

Composition Blends

The compositions of the invention preferably include from about 1 percent to about 100 percent urethane or urea acrylate functional polymers, however, the compositions may be blended with other acrylates. For example, in one embodiment, the composition contains about 10 percent to about 90 percent of the acrylate end-capped polymer of the invention, preferably from about 10 percent to about 75 percent, and contains about 90 percent to 10 percent, more preferably from about 90 percent to about 25 percent of at least one other acrylate as described below. Unless otherwise stated herein, all percentages are given in percent by weight of the total composition of the golf ball layer in question.

Suitable acrylates for use in a composition based on urethane or urea acrylates include, but are not limited to, epoxy acrylates, epoxy methacrylates, aromatic acid acrylate half esters, aromatic acid methacrylate half esters, and combinations thereof. Those of ordinary skill in the art would readily recognize that additional acrylates may be blended with the urethane or urea acrylate functional polymer without detracting from the beneficial properties of such a composition.

Golf Ball Construction

The acrylate functional polymer of the present invention may be used with any type of ball construction. For example, one-piece, two-piece, three-piece, and four-piece golf ball designs are contemplated by the present invention. In addition, golf balls having double cores, intermediate layer(s), and/or double covers are also useful with the present invention. As known to those of ordinary skill in the art, the type of golf ball constructed, i.e., double core, double cover, and the like, depends on the type of performance desired of the ball. As used herein, the term "layer" includes any generally spherical portion of a golf ball, i.e., a golf ball core or center, an intermediate layer, and/or a golf ball cover. As used herein, the term "inner layer" refers to any golf ball layer beneath the outermost structural layer of the golf ball. As used herein, the term "multilayer" means at least two layers.

The compositions of the invention are intended for use in forming structural layers having a thickness of about 50 μm or greater. As used herein, "structural layer" does not include a decorative coating layer, top coat, paint layer, or the like.

Figure 2:
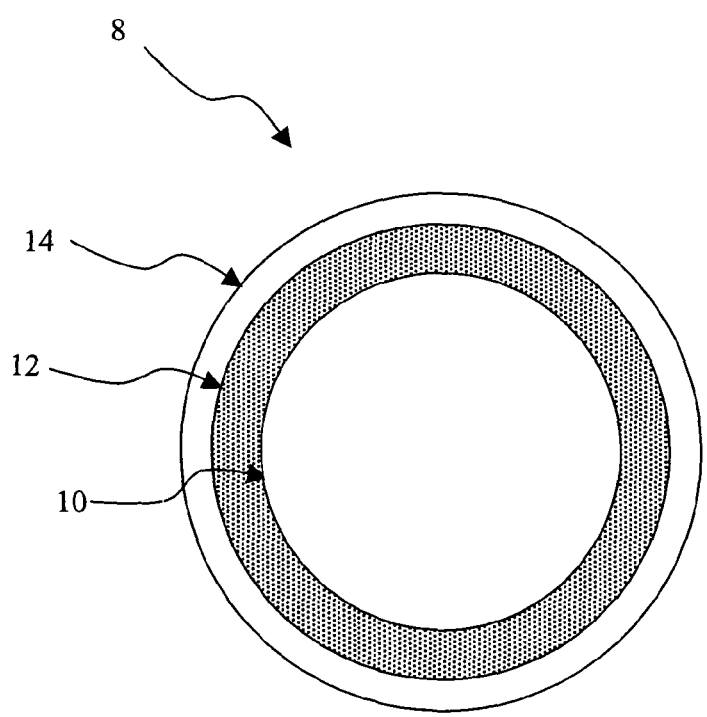
FIG. 2 is a cross-sectional view of a multi-component golf ball, wherein at least a portion of the golf ball is formed from the compositions of the invention.
Figure 3:
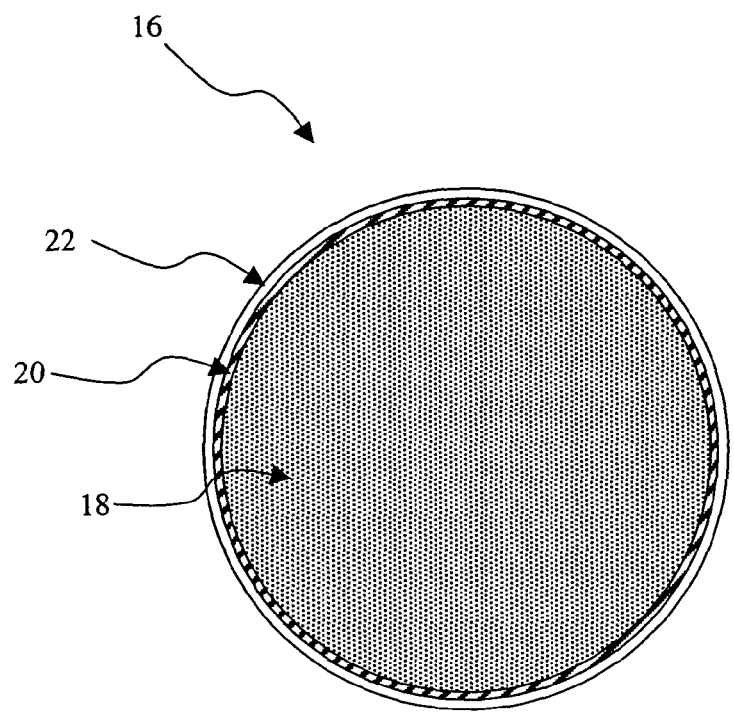
FIG. 3 is a cross-sectional view of a multi-component golf ball including a large core, an intermediate layer, and a thin outer cover layer disposed thereon, wherein at least a portion of the golf ball is formed from the compositions of the invention.
Figure 4:
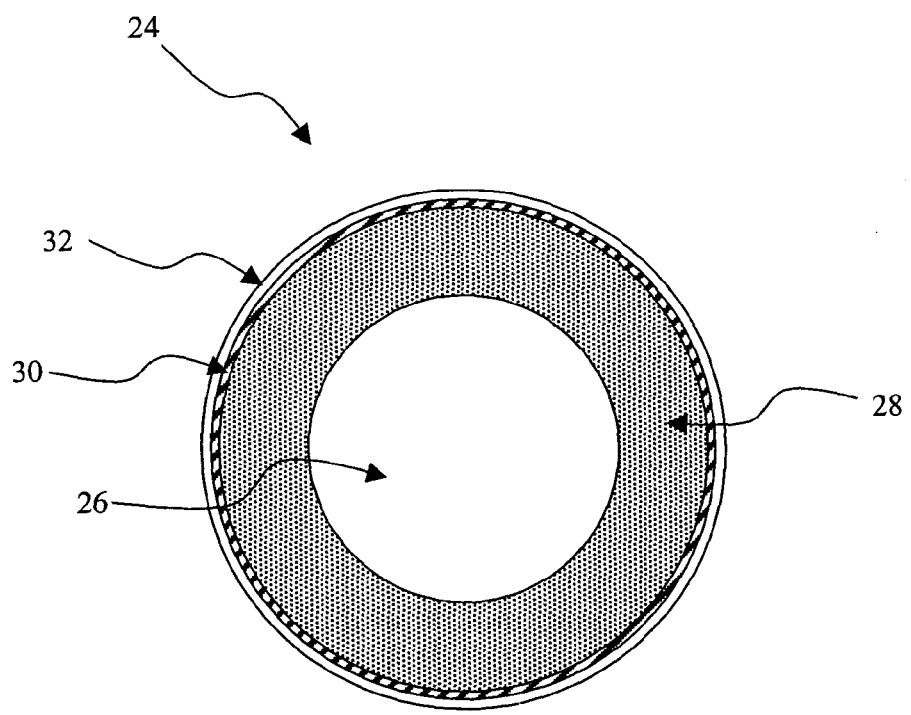
FIG. 4 is a cross-sectional view of a multi-component golf ball including a core, an outer core layer, a thin inner cover layer, and a thin outer cover layer disposed thereon, wherein at least a portion of the golf ball is formed from the compositions of the invention.

In one embodiment, a golf ball 2 according to the invention (as shown in FIG. 1) includes a core 4 and a cover 6, wherein the at least one of core 4 and cover 6 incorporates at least one layer including the castable acrylate functional composition of the invention. Similarly, FIG. 2 illustrates a golf ball according to the invention incorporating an intermediate layer. Golf ball 8 includes a core 10, a cover 14, and an intermediate layer 12 disposed between the core 10 and cover 14. Any of the core 10, intermediate layer 12, or cover 14 may incorporate at least one layer that includes the castable acrylate functional compositions of the invention. FIG. 3 illustrates a multilayer golf ball 16 according to the invention including a large core 18, an outer core layer, intermediate layer, or inner cover layer 20, and an outer cover layer 22. Any of the core 18, outer core layer, intermediate layer, or inner cover layer 20, and outer cover layer 22 may include the acrylate functional composition of the invention. FIG. 4 shows a four-piece golf ball 24 according to the invention including a core 26, an outer core layer or intermediate layer 28, an inner cover layer 30, and an outer cover layer 32. Any of the core 26, outer core layer or intermediate layer 28, inner cover layer 30, and outer cover layer 32 may include the acrylate functional composition of the invention.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, US2002/0028885, US2002/0151380. The entire disclosures of these patents and published patent applications are incorporated by reference herein. For example, in Publication No. US2002/015380, a golf ball having three or more cover layers is disclosed, of which any of the layers of the ball may be formed using the acrylate functional compositions of the invention. In addition, the compositions of the invention are contemplated for use in layers of the gradated hardness multilayer golf balls disclosed in U.S. Patent Publication No. 2001/0005699, which is incorporated by reference herein in its entirety.

As discussed, the golf balls of the invention include at least one structural layer that includes the acrylate functional compositions of the invention. In addition, as discussed in more detail below, the golf balls of the invention may include core layers, intermediate layers, or cover layers formed from materials known to those of skill in the art. These examples are not exhaustive, as skilled artisans would be aware that a variety of materials might be used to produce a golf ball of the invention with desired performance properties.

Core Layer(s)

The cores of the golf balls formed according to the invention may be solid, semi-solid, hollow, fluid-filled, or powder filled, but are preferably solid and formed with the compositions of the invention. As used herein, the term "core" means the innermost portion of a golf ball, and may include one or more layers. For example, U.S. Pat. Nos. 6,180,040 and 6,180,722 disclose methods of preparing dual core golf balls. The entire disclosures of these patents are incorporated by reference herein. The term "semi-solid" as used herein refers to a paste, a gel, or the like. The cores of the golf balls of the invention may be spherical, cubical, pyramid-shaped, geodesic, or any three-dimensional, symmetrical shape.

While the cores of the invention may be formed with the acrylate functional compositions of the invention, conventional materials may also be used to form the cores. Suitable core materials include, but are not limited to, thermoset materials, such as rubber, styrene butadiene, polybutadiene, isoprene, polyisoprene, trans-isoprene, and polyurethane, and thermoplastic materials, such as conventional ionomer resins, polyamides, polyesters, and polyurethane. In one embodiment, at least one layer of the core is formed from a polybutadiene reaction product, such as the reaction products disclosed in U.S. Patent Publication No. 2003/0119989, the entire disclosure of which is incorporated by reference herein.

Additional materials may be included in the core layer compositions outlined above. For example, catalysts, coloring agents, optical brighteners, crosslinking agents, whitening agents such as $TiO_2$ and ZnO, UV absorbers, hindered amine light stabilizers, defoaming agents, processing aids, surfactants, and other conventional additives may be added to the core layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the core layer compositions. One of ordinary skill in the art should be aware of the requisite amount for each type of additive to realize the benefits of that particular additive.

The core may also include one or more wound layers (surrounding a fluid or solid center) including at least one tensioned elastomeric material wound about the center. In one embodiment, the tensioned elastomeric material includes natural or synthetic elastomers or blends thereof, in which the synthetic elastomer preferably includes LYCRA. In another embodiment, the tensioned elastomeric material incorporates a polybutadiene reaction product as disclosed in co-pending U.S. Patent Publication No. 2003/0119989. In yet another embodiment, the tensioned elastomeric material may also be formed from conventional polyisoprene. In still another embodiment, a polyurea composition (as disclosed in co-pending U.S. Patent Publication No. 2003/0096936, which is incorporated by reference in its entirety by reference herein) is used to form the tensioned elastomeric material. In another embodiment, solvent spun polyethers urea, as disclosed in U.S. Pat. No. 6,149,535, which is incorporated in its entirety by reference herein, is used to form the tensioned elastomeric material in an effort to achieve a smaller cross-sectional area with multiple strands.

The tensioned elastomeric layer may also be a high tensile filament having a tensile modulus of about 10,000 kpsi or greater, as disclosed in co-pending U.S. Patent Publication Nos. 2002/0160859 and 2002/0160862, the entire disclosures of which are incorporated by reference herein.

In another aspect of the invention, the golf balls of the invention include a thin, highly filled core layer, such as the ones disclosed in U.S. Pat. No. 6,494,795, which is incorporated by reference herein in its entirety. A thin, highly filled core layer allows the weight or mass of the golf ball to be allocated radially relative to the centroid, thereby dictating the moment of inertia of the ball. When the weight is allocated radially toward the centroid, the moment of inertia is decreased, and when the weight is allocated outward away from the centroid, the moment of inertia is increased.

Intermediate Layer(s)

As used herein, "intermediate layer" includes any layer between the innermost layer of the golf ball and the outermost layer of the golf ball. Therefore, intermediate layers may also be referred to as outer core layers, inner cover layers, and the like. When the golf ball of the present invention includes an intermediate layer, this layer may be formed from the acrylate functional compositions of the invention.

The intermediate layer may also be formed of conventional materials known to those of ordinary skill in the art, including various thermoset and thermoplastic materials, as well as blends thereof. For example, the intermediate layers of the golf ball of the invention may be formed with the compositions of the invention. The intermediate layer may likewise be formed, at least in part, from one or more homopolymeric or copolymeric materials, such as vinyl resins, polyolefins, polyurethanes, polyureas, polyamides, acrylic resins, olefinic thermoplastic rubbers, block copolymers of styrene and butadiene, isoprene or ethylene-butylene rubber, copoly(ether-amide), polyphenylene oxide resins, thermoplastic polyesters, ethylene, propylene, 1-butene or 1-hexene based homopolymers or copolymers, and the like.

The intermediate layer may also be formed from highly neutralized polymers such as those disclosed U.S. Patent Publication No. 2001/0018375 and 2001/0019971, which are incorporated herein in their entirety by express reference thereto; grafted and non-grafted metallocene catalyzed polyolefins and polyamides, polyamide/ionomer blends, and polyamide/nonionomer blends, such as those disclosed in U.S Patent Publication No. 2003/0078348, which is incorporated by reference herein in its entirety; among other polymers. Examples of other suitable intermediate layer materials include blends of some of the above materials, such as those disclosed in U.S. Pat. No. 5,688,181, the entire disclosure of which is incorporated by reference herein.

Additional materials may be included in the intermediate layer compositions outlined above. For example, catalysts, coloring agents, optical brighteners, crosslinking agents, whitening agents such as $TiO_2$ and $ZnO$, UV absorbers, hindered amine light stabilizers, defoaming agents, processing aids, surfactants, and other conventional additives may be added to the intermediate layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the intermediate layer compositions. One of ordinary skill in the art should be aware of the requisite amount for each type of additive to realize the benefits of that particular additive.

The intermediate layer may also be formed of a binding material and an interstitial material distributed in the binding material, as discussed in U.S Patent Publication No. 2003/0125134, the entire disclosure of which is incorporated by reference herein. In addition, at least one intermediate layer may also be a moisture barrier layer, such as the ones described in U.S. Pat. No. 5,820,488, which is incorporated in its entirety by reference herein. The intermediate layer may also be formed from any of the polyurethane, polyurea, and polybutadiene materials discussed co-pending U.S. Patent Publication No. 2003/0096936.

Cover Layer(s)

The cover provides the interface between the ball and a club. As used herein, the term "cover" means the outermost portion of a golf ball. A cover typically includes at least one layer and may contain indentations such as dimples and/or ridges. Paints and/or laminates are typically disposed about the cover to protect the golf ball during use thereof. The cover may include a plurality of layers, e.g., an inner cover layer disposed about a golf ball center and an outer cover layer formed thereon.

Inner and/or outer cover layers may be cast from the acrylate functional compositions of the invention. Alternatively, both the inner and/or outer cover layers of golf balls of the present invention may be formed of the highly neutralized ionomer compositions, other cover materials known to those of skill in the art, or blends thereof. For example, the cover may be formed of polyurea, polyurethane, or mixtures thereof, as disclosed in co-pending U.S. Patent Publication No. 2003/0096936 and U.S. patent application Ser. No. 10/339,603, filed Jan. 10, 2003, entitled "Polyurethane Compositions for Golf Balls." The entire disclosures of these applications are incorporated by reference herein.

In addition, cover layers may also be formed of one or more homopolymeric or copolymeric materials, such as vinyl resins, polyolefins, conventional polyurethanes and polyureas, such as the ones disclosed in U.S. Pat. Nos. 5,334,673, and 5,484,870, polyamides, saturated acrylic resins and blends of these resins with poly vinyl chloride, elastomers, and the like, thermoplastic urethanes, olefinic thermplastic rubbers, block copolymers of styrene and butadiene, polyphenylene oxide resins or blends of polyphenylene oxide with high impact polystyrene, thermoplastic polyesters, ethylene, propylene, 1-butene or 1-hexane based homopolymers or copolymers including functional monomers, methyl acrylate, methyl methacrylate homopolymers and copolymers, low acid ionomers, high acid ionomers, alloys, and mixtures thereof. Those of ordinary skill in the art would recognize that the saturated acrylic resins mentioned above are distinct from the unsaturated acrylic resins used to endcap the precursors of the present invention. For example, the saturated acrylic resins dislosed in the prior art are typically acrylic and methacrylic resins used in ionomer resin compositions. Such acrylic resins are thermoplastic, unreactable materials. In contrast, the unsaturated acrylic resins for use with the present invention are castable and reactive in nature.

The cover may also be at least partially formed from a polybutadiene reaction product as disclosed in U.S. Patent Publication No. 2003/0119989.

Additional materials may be included in the cover layer compositions outlined above. For example, catalysts, coloring agents, optical brighteners, crosslinking agents, whitening agents such as $TiO_2$ and ZnO, UV absorbers, hindered amine light stabilizers, defoaming agents, processing aids, surfactants, and other conventional additives may be added to the cover layer compositions of the invention. In addition, antioxidants, stabilizers, softening agents, plasticizers, including internal and external plasticizers, impact modifiers, foaming agents, density-adjusting fillers, reinforcing materials, and compatibilizers may also be added to any of the cover layer compositions. Those of ordinary skill in the art should be aware of the requisite amount for each type of additive to realize the benefits of that particular additive.

In addition, while hardness gradients are typically used in a golf ball to achieve certain characteristics, the present invention also contemplates the compositions of the invention being used in a golf ball with multiple cover layers having essentially the same hardness, wherein at least one of the layers has been modified in some way to alter a property that affects the performance of the ball. Such ball constructions are disclosed in co-pending U.S. patent application Ser. No. 10/167,744, filed Jun. 13, 2002, entitled "Golf Ball with Multiple Cover Layers," the entire disclosure of which is incorporated by reference herein.

As discussed above with respect to the core of the golf balls of the invention, the use of a thin, highly filled layer allows the weight or mass of the golf ball to be allocated radially relative to the centroid, thereby dictating the moment of inertia of the ball. This concept is translatable to the cover layers of a golf ball. Thus, the inner cover layer may be a thin, dense layer so as to form a high moment of inertia ball. In this aspect of the invention, the inner cover layer preferably has a specific gravity of greater than 1.2, more preferably more than 1.5, even more preferably more than 1.8, and most preferably more than 2.0. Suitable materials for the thin, dense layer include any material that meets the specific gravity stated above. For example, this thin, highly filled inner cover layer may be formed of the radiation-curable compositions of the invention, adjusting for the requisite specific gravity. Alternatively, the inner cover layer may be formed from epoxies, styrenated polyesters, polyurethanes or polyureas, liquid PBR's, silicones, silicate gels, agar gels, and the like.

Methods for Forming Golf Ball Components

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like depending on the materials used for a specific component. For example, the acrylate functional compositions of the invention are particular useful in casting applications. Thus, golf ball components including the compositions of the invention may be formed by casting.

A method of injection molding using a split vent pin can be found in co-pending U.S. Patent Publication No. 2002/0079615 Examples of retractable pin injection molding may be found in U.S. Pat. Nos. 6,129,881, 6,235,230, and 6,379,138. These molding references are incorporated in their entirety by reference herein. In addition, a chilled chamber, i.e., a cooling jacket, such as the one disclosed in U.S. patent application Ser. No. 09/717,136, filed Nov. 22, 2000, entitled "Method of Making Golf Balls" may be used to cool the castable compositions, which also allows for a lower initiation temperature and a higher loading of catalyst (if used) into the system.

One skilled in the art would appreciate that the molding method used may be determined at least partially by the properties of the composition. For example, casting, RIM, or LIM may be preferred when the material is thermoset, whereas compression molding or injection molding may be preferred for liquid compositions (such as gumstock) or thermoplastic precursors. In addition, the intermediate layer may also be formed from using any suitable method known to those of ordinary skill in the art. For instance, an intermediate layer may be formed by casting and covered with a dimpled cover layer formed by injection molding, compression molding, casting, vacuum forming, powder coating, and the like.

It is important to note, however, that the compositions of the present invention differ from traditional urethane or urea compositions in that those compositions are 2-component systems that are mixed and cured. The compositions of the present invention, on the other hand, may be single pack, thermally cured compositions with indefinite pot life. For example, the compositions of the present invention may be mixed and stored for an indefinite period of time without curing until it is subjected to a free radical initiator.

In particular, the compositions of the invention may be cast about an inner ball. The casting process is preferably cured in a closed mold. In an alternate embodiment, the casting process may be performed under nitrogen. In addition, the casting process may be such that one half of the layer is formed in a mold with an inner ball partially submerged therein. The second half of the layer may then be assembled to the first half and cured to form a finished golf ball component.

Any inner layer of the golf balls of the invention may be surface treated prior to cover formation to further increase the adhesion between the outer surface of the inner ball and the cover. In addition, the outermost cover of the golf balls of the invention may be surface treated prior to application of any coating layer. Such surface treatment may include mechanically or chemically abrading the outer surface of the subassembly. Additionally, the inner ball may be subjected to corona discharge, plasma treatment, and/or silane dipping prior to forming the cover around it. Other layers of the ball, e.g., the core, also may be surface treated. Examples of these and other surface treatment techniques can be found in U.S. Pat. No. 6,315,915, which is incorporated by reference in its entirety.

The methods discussed herein and other manufacturing methods for forming the golf ball components of the present invention are also disclosed in U.S. Pat. Nos. 6,207,784 and 5,484,870, the disclosures of which are incorporated herein by reference in their entirety.

Dimples

The golf balls of the invention are preferably designed with certain flight characteristics in mind. The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Alternatively, the dimple pattern can be arranged according to phyllotactic patterns, such as described in U.S. Pat. No. 6,338,684, or a a tubular lattice pattern, such as the one disclosed in U.S. Pat. No. 6,290,615, the disclosures of which are incorporated herein in their entirety.

Dimple patterns may also be based on Archimedean patterns including a truncated octahedron, a great rhombcuboctahedron, a truncated dodecahedron, and a great rhombicosidodecahedron, wherein the pattern has a non-linear parting line, as disclosed in U.S. patent application Ser. No. 10/078,417, which is incorporated in its entirety by reference herein. The golf balls of the present invention may also be covered with non-circular shaped dimples, i.e., amorphous shaped dimples, as disclosed in U.S. Pat. No. 6,409,615, which is incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. In one embodiment, the golf balls of the invention have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have a dimple coverage of at least about 75 percent or greater, about 80 percent or greater, or even about 85 percent or greater.

The golf balls of the present invention may also have a plurality of pyramidal projections disposed on the intermediate layer of the ball, as disclosed in U.S. Pat. No. 6,383,092, which is incorporated in its entirety by reference herein. The plurality of pyramidal projections on the golf ball may cover between about 20 percent to about 80 of the surface of the intermediate layer. In an alternative embodiment, the golf ball may have a non-planar parting line allowing for some of the plurality of pyramidal projections to be disposed about the equator.

Several additional non-limiting examples of dimple patterns with varying sizes of dimples are also provided in U.S. Pat. Nos. 6,358,161 and 6,213,898, the entire disclosures of which are incorporated by reference herein.

The total number of dimples on the ball, or dimple count, may vary depending such factors as the sizes of the dimples and the pattern selected. In general, the total number of dimples on the ball preferably is between about 100 to about 1000 dimples, although one skilled in the art would recognize that differing dimple counts within this range can significantly alter the flight performance of the ball. In one embodiment, the dimple count is about 380 dimples or greater, but more preferably is about 400 dimples or greater, and even more preferably is about 420 dimples or greater. In one embodiment, the dimple count on the ball is about 422 dimples. In some cases, it may be desirable to have fewer dimples on the ball. Thus, one embodiment of the present invention has a dimple count of about 380 dimples or less, and more preferably is about 350 dimples or less.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as disclosed in U.S. Patent Publication No. 2003/0114255, which is incorporated in its entirety by reference herein, is contemplated for use with the golf balls of the present invention.

Golf Ball Post-Processing

The golf balls of the present invention may be painted, coated, or surface treated for further benefits. For example, a golf ball of the invention may be treated with a base resin paint composition or the cover composition may contain certain additives to achieve a desired color characteristic. In one embodiment, the golf ball cover composition contains a fluorescent whitening agent, e.g., a derivative of 7-triazinylamino-3-phenylcoumarin, to provide improved brightness. An example of such a fluorescent whitening agent is disclosed in U.S. Patent Publication No. 2002/0082358, which is incorporated by reference herein in its entirety.

Protective and decorative coating materials, as well as methods of applying such materials to the surface of a golf ball cover are well known in the golf ball art. Generally, such coating materials comprise urethanes, urethane hybrids, epoxies, polyesters and acrylics. If desired, more than one coating layer can be used. The coating layer(s) may be applied by any suitable method known to those of ordinary skill in the art. For example, the coating layer(s) may be applied to the golf ball cover by an in-mold coating process, such as described in U.S. Pat. No. 5,849,168, which is incorporated in its entirety by reference herein. The coating layer may have a thickness of about 0.004 inches or less, more preferably about 0.002 inches or less.

In addition, the golf balls of the invention may be painted or coated with an ultraviolet curable/treatable ink, by using the methods and materials disclosed in U.S. Pat. Nos. 6,500,495, 6,248,804, and 6,099,415, the entire disclosures of which are incorporated by reference herein.

In addition, trademarks or other indicia may be stamped, i.e., pad-printed, on the outer surface of the ball cover, and the stamped outer surface is then treated with at least one clear coat to give the ball a glossy finish and protect the indicia stamped on the cover.

The golf balls of the invention may also be subjected to dye sublimation, wherein at least one golf ball component is subjected to at least one sublimating ink that migrates at a depth into the outer surface and forms an indicia. The at least one sublimating ink preferably includes at least one of an azo dye, a nitroarylamine dye, or an anthraquinone dye. U.S. Patent Publication No. 20030106442, the entire disclosure of which is incorporated by reference herein.

Laser marking of a selected surface portion of a golf ball causing the laser light-irradiated portion to change color is also contemplated for use with the present invention. U.S. Pat. Nos. 5,248,878 and 6,075,223 generally disclose such methods, the entire disclosures of which are incorporated by reference herein. In addition, the golf balls may be subjected to ablation, i.e., directing a beam of laser radiation onto a portion of the cover, irradiating the cover portion, wherein the irradiated cover portion is ablated to form a detectable mark, wherein no significant discoloration of the cover portion results therefrom. Ablation is discussed in U.S. Pat. No. 6,462,303, which is incorporated in its entirety by reference herein.

Golf Ball Properties

The properties such as hardness, modulus, core diameter, intermediate layer thickness and cover layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention. It should be understood that the ranges herein are meant to be intermixed with each other, i.e., the low end of one range may be combined with a high end of another range.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used. Preferably, the overall diameter of the core and all intermediate layers is about 80 percent to about 98 percent of the overall diameter of the finished ball.

The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.54 inches or greater, preferably about 1.55 inches or greater. In one embodiment, the core diameter is about 1.59 inches or greater. In another embodiment, the diameter of the core is about 1.64 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. The thickness of the outer cover layer may be from about 0.005 inches to about 0.100 inches, preferably about 0.007 inches to about 0.035 inches. In one embodiment, the cover thickness is from about 0.02 inches to about 0.35 inches. In another embodiment, the cover preferably has a thickness of about 0.02 inches to about 0.12 inches, preferably about 0.1 inches or less, more preferably about 0.07 inches or less. In yet another embodiment, the outer cover has a thickness from about 0.02 inches to about 0.07 inches. In still another embodiment, the cover thickness is about 0.05 inches or less, preferably from about 0.02 inches to about 0.05 inches. For example, the outer cover layer may be between about 0.02 inches and about 0.045 inches, preferably about 0.025 inches to about 0.04 inches thick. In one embodiment, the outer cover layer is about 0.03 inches thick.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less.

Hardness

Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

When the intermediate layer is intended to be harder than the core layer, the ratio of the intermediate layer hardness to the core hardness preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In this embodiment when the outer cover layer is softer than the intermediate layer or inner cover layer, the ratio of the Shore D hardness of the outer cover material to the intermediate layer material is about 0.8 or less, preferably about 0.75 or less, and more preferably about 0.7 or less. In another embodiment, the ratio is about 0.5 or less, preferably about 0.45 or less.

In yet another embodiment, the ratio is about 0.1 or less when the cover and intermediate layer materials have hardnesses that are substantially the same. When the hardness differential between the cover layer and the intermediate layer is not intended to be as significant, the cover may have a hardness of about 55 Shore D to about 65 Shore D. In this embodiment, the ratio of the Shore D hardness of the outer cover to the intermediate layer is about 1.0 or less, preferably about 0.9 or less.

In another embodiment, the cover layer is harder than the intermediate layer. In this design, the ratio of Shore D hardness of the cover layer to the intermediate layer is about 1.33 or less, preferably from about 1.14 or less.

Compression

Compression values are dependent on the diameter of the component being measured. Atti compression is typically used to measure the compression of a golf ball. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J.

The Atti compression of the core, or portion of the core, of golf balls prepared according to the invention is preferably less than about 80, more preferably less than about 75. In another embodiment, the core compression is from about 40 to about 80, preferably from about 50 to about 70. In yet another embodiment, the core compression is preferably below about 50, and more preferably below about 25. In an alternative, low compression embodiment, the core has a compression less than about 20, more preferably less than about 10, and most preferably, 0. As known to those of ordinary skill in the art, however, the cores generated according to the present invention may be below the measurement of the Atti Compression Gauge.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 60 to 100. In yet another embodiment, the compression of the golf balls of the invention is about 75 or greater and about 95 or less. For example, a preferred golf ball of the invention may have a compression from about 80 to about 95.

Initial Velocity and COR

There is currently no USGA limit on the COR of a golf ball, but the initial velocity of the golf ball cannot exceed 250±5 feet/second (ft/s). Thus, in one embodiment, the initial velocity is about 245 ft/s or greater and about 255 ft/s or greater. In another embodiment, the initial velocity is about 250 ft/s or greater. In one embodiment, the initial velocity is about 253 ft/s to about 254 ft/s. In yet another embodiment, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range. For example, a golf ball of the invention may be designed to have an initial velocity of about 220 ft/s or greater, preferably about 225 ft/s or greater.

As a result, of the initial velocity limitation set forth by the USGA, the goal is to maximize COR without violating the 255 ft/s limit. The COR of a ball is measured by taking the ratio of the outbound or rebound velocity to the incoming or inbound velocity. In a one-piece solid golf ball, the COR will depend on a variety of characteristics of the ball, including its composition and hardness. For a given composition, COR will generally increase as hardness is increased. In a two-piece solid golf ball, e.g., a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of about 0.800 or greater. In yet another embodiment, the COR of the balls of the invention is about 0.800 to about 0.815.

In addition, the inner ball preferably has a COR of about 0.780 or more. In one embodiment, the COR is about 0.790 or greater.

Spin Rate

As known to those of ordinary skill in the art, the spin rate of a golf ball will vary depending on the golf ball construction. In a multilayer ball, e.g., a core, an intermediate layer, and a cover, wherein the cover is formed from the compositions of the invention, the spin rate of the ball off a driver ("driver spin rate") may be 1500 rpm or greater. In one embodiment, the driver spin rate is about 2000 rpm to about 3500 rpm. In another embodiment, the driver spin rate is about 2200 rpm to about 3400 rpm. In still another embodiment, the driver spin rate may be less than about 1500 rpm.

Two-piece balls made according to the invention may also have driver spin rates of 1500 rpm and greater. In one embodiment, the driver spin rate is about 2000 rpm to about 3300 rpm. Wound balls made according to the invention preferably have similar spin rates.

Methods of determining the spin rate should be well understood by those of ordinary skill in the art. Examples of methods for determining the spin rate are disclosed in U.S. Pat. Nos. 6,500,073, 6,488,591, 6,286,364, and 6,241,622, which are incorporated by reference herein in their entirety.

Flexural Modulus

Accordingly, it is preferable that the golf balls of the present invention have an intermediate layer with a flexural modulus of about 500 psi to about 500,000 psi according to ASTM D-6272-98. More preferably, the flexural modulus of the intermediate layer is about 1,000 psi to about 250,000 psi. Most preferably, the flexural modulus of the intermediate layer is about 2,000 psi to about 200,000 psi.

The flexural modulus of the cover layer is preferably about 2,000 psi or greater, and more preferably about 5,000 psi or greater. In one embodiment, the flexural modulus of the cover is from about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi. In another embodiment, the flexural modulus of the cover layer is about 100,000 psi or less, preferably about 80,000 or less, and more preferably about 70,000 psi or less. For example, the flexural modulus of the cover layer may be from about 10,000 psi to about 70,000 psi, from about 12,000 psi to about 60,000 psi, or from about 14,000 psi to about 50,000 psi.

In one embodiment, when the cover layer has a hardness of about 50 Shore D to about 60 Shore D, the cover layer preferably has a flexural modulus of about 55,000 psi to about 65,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Specific Gravity

The specific gravity of a cover or intermediate layer is preferably at least about 0.7. In one embodiment, the specific gravity of the intermediate layer or cover is about 0.8 or greater, preferably about 0.9 or greater. For example, in one embodiment, the golf ball has an intermediate layer with a specific gravity of about 0.9 or greater and a cover having a specific gravity of about 0.95 or greater. In another embodiment, the intermediate layer or cover has a specific gravity of about 1.00 or greater. In yet another embodiment, the specific gravity of the intermediate layer or cover is about 1.05 or greater, preferably about 1.10 or greater.

The core may have a specific gravity of about 1.00 or greater, preferably 1.05 or greater. For example, a golf ball of the invention may have a core with a specific gravity of about 1.10 or greater and a cover with a specific gravity of about 0.95 or greater.

The invention described and claimed herein is not to be limited in scope by the specific embodiments herein disclosed, since these embodiments are intended as illustrations of several aspects of the invention. Any equivalent embodiments are intended to be within the scope of this invention. For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising a core and a cover, wherein the cover is cast from a castable reactive acrylate functional composition consisting essentially of:
    a saturated polyurethane backbone;
    at least one acrylate functional component reacted with the saturated polyurethane backbone; and
    at least one free radical initiator.

2. The golf ball of claim 1, wherein the at least one acrylate functional component is selected from the group consisting of monofunctional, difunctional, trifunctional, tetrafunctional, and pentafunctional monomers and oligomers, and combinations thereof.

3. The golf ball of claim 1, wherein the at least one acrylate functional component has a viscosity of about 100 cP or greater.

4. The golf ball of claim 1, wherein the at least one free radical initiator comprises at least one peroxide.

5. The golf ball of claim 1, wherein the at least one free radical initiator comprises at least one azo compound.

6. The golf ball of claim 4, wherein the at least one free radical initiator is selected from the group consisting of di-t-amyl peroxide, tert-amyl peroxy-2-ethylhexyl carbonate, t-amyl peroxyacetate, ethyl 3,3-D (t-amylperoxy) butyrate, 2,2-di-(t-amylperoxy) propane, t-amyl perbenzoate, di(2-t-butyl-peroxyisopropyl)benzene peroxide, 1,1-bis(t-butylperoxy)-3,3,5-trimethylcyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, and mixtures thereof.

7. The golf ball of claim 1, further comprising an intermediate layer.

8. The golf ball of claim 7, wherein the intermediate layer comprises an ionomeric material.

9. The golf ball of claim 1, wherein the golf ball further comprises at least one top coat disposed about the cover.

10. The golf ball of claim 9, wherein the cover has a thickness of about 50 μm or greater.

11. The golf ball of claim 10, wherein the cover has a thickness of about 0.2 inches to about 0.035 inches.

12. A golf ball comprising at least one cover layer formed from an acrylate functional composition consisting essentially of:
a polyurethane backbone formed from the reaction of at least one isocyanate and at least one polyol;
at least one unsaturated acrylate functional segment reacted with the polyurethane backbone; and
at least one free radical initiator.

13. The golf ball of claim 12, wherein the at least one unsaturated acrylate functional segment comprises hydroxy-terminated acrylates, amine-terminated acrylates, or mixtures thereof.

14. The golf ball of claim 13, wherein the at least one acrylate functional segment comprises hydroxy-terminated acrylate, hydroxy-terminated methacrylate, hydroxy-terminated methyl methacrylate, hydroxy-terminated ethyl acrylate, hydroxy-terminated ethyl methacrylate, hydroxy-terminated butyl acrylate, hydroxy-terminated butyl methacrylate, hydroxy-terminated glycidyl acrylate, hydroxy-terminated glycidal methacrylate, or mixtures thereof.

15. The golf ball of claim 12, wherein the at least one free radical initiator comprises at least one peroxide.

16. The golf ball of claim 15, wherein the at least one free radical initiator comprises di-t-amyl peroxide, di(2-t-butyl-peroxyisopropyl)benzene peroxide, 1,1-bis(t-butylperoxy)-3,3,5-trimethylcyclohexane, dicumyl peroxide, di-t-butyl peroxide, 2,5-di-(t-butylperoxy)-2,5-dimethyl hexane, n-butyl-4,4-bis(t-butylperoxy)valerate, lauryl peroxide, benzoyl peroxide, t-butyl hydroperoxide, or mixtures thereof.

17. The golf ball of claim 15, wherein the at least one free radical initiator is selected from the group consisting of di-t-amyl peroxide, tert-amyl peroxy-2-ethylhexyl carbonate, t-amyl peroxyacetate, ethyl 3,3-D (t-amylperoxy) butyrate, 2,2-di-(t-amylperoxy) propane, t-amyl perbenzoate, and mixtures thereof.

18. The golf ball of claim 12, wherein the at least one unsaturated acrylate functional segment comprises epoxy acrylates, epoxy methacrylates, acrylate half esters, methacrylate half esters, polybutadiene acrylates, urea acrylates, and combinations thereof.

19. A golf ball comprising a core, an inner cover, and an outer cover, wherein at least one of the inner cover or outer cover is formed from an acrylate functional composition consisting essentially of:
a polyurethane backbone formed from the reaction of at least one isocyanate and at least one hydroxy-terminated compound;
at least one unsaturated acrylate functional segment reacted with the polyurethane backbone; and
at least one free radical initiator.

20. The golf ball of claim 19, wherein the at least one unsaturated acrylate functional segment comprises hydroxy-terminated acrylate, hydroxy-terminated methacrylate, hydroxy-terminated methyl methacrylate, hydroxy-terminated ethyl acrylate, hydroxy-terminated ethyl methacrylate, hydroxy-terminated butyl acrylate, hydroxy-terminated butyl methacrylate, hydroxy-terminated glycidyl acrylate, hydroxy-terminated glycidal methacrylate, or mixtures thereof.

21. The golf ball of claim 19, wherein the at least one unsaturated acrylate functional segment comprises hydroxy-terminated acrylates, amine-terminated acrylates, or mixtures thereof.

22. The golf ball of claim 19, wherein the polyurethane backbone comprises linkages having the general formula:

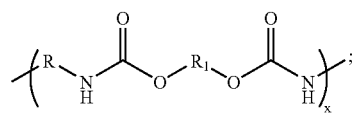

or a mixture thereof, wherein x is the chain length, i.e., about 1 or greater, and wherein R and $R_1$ are straight chain or branched hydrocarbon chains having about 1 to about 20 carbons, and wherein the linkages form greater than about 10 percent of the polyurea backbone.

23. The golf ball of claim 19, wherein the acrylate functional composition is present in the outer cover layer.

24. The golf ball of claim 19, wherein the at least one free radical initiator is selected from the group consisting of di-t-amyl peroxide, tert-amyl peroxy-2-ethylhexyl carbonate, t-amyl peroxyacetate, ethyl 3,3-D (t-amylperoxy) butyrate, 2,2-di-(t-amylperoxy) propane, t-amyl perbenzoate, and mixtures thereof.

* * * * *